US012656719B2

(12) United States Patent
Sato

(10) Patent No.: US 12,656,719 B2
(45) Date of Patent: Jun. 16, 2026

(54) SHEET CONVEYANCE APPARATUS AND IMAGE FORMING APPARATUS

(71) Applicant: CANON KABUSHIKI KAISHA, Tokyo (JP)

(72) Inventor: Kengo Sato, Saitama (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 18/949,185

(22) Filed: Nov. 15, 2024

(65) Prior Publication Data

US 2025/0164917 A1 May 22, 2025

(30) Foreign Application Priority Data

Nov. 17, 2023 (JP) ................................ 2023-195816

(51) Int. Cl.
*G03G 15/00* (2006.01)
*B65H 5/06* (2006.01)
*B65H 9/00* (2006.01)

(52) U.S. Cl.
CPC ......... *G03G 15/6561* (2013.01); *B65H 5/062* (2013.01); *B65H 9/002* (2013.01); *G03G 15/6511* (2013.01); *G03G 15/6567* (2013.01); *B65H 2301/331* (2013.01); *B65H 2301/3412* (2013.01); *B65H 2301/3613* (2013.01); *B65H 2404/1441* (2013.01); *B65H 2601/272* (2013.01); *B65H 2701/1311* (2013.01)

(58) Field of Classification Search
CPC ........... G03G 15/6561; G03G 15/6511; G03G 15/6567; B65H 5/062; B65H 9/002; B65H 2301/331; B65H 2301/3412; B65H 2301/3613; B65H 2404/1441; B65H 2601/272; B65H 2701/1311
See application file for complete search history.

(56) References Cited

U.S. PATENT DOCUMENTS

| | | | | |
|---|---|---|---|---|
| 5,918,876 A * | 7/1999 | Maruyama | B65H 5/062 271/274 |
| 6,173,952 B1 * | 1/2001 | Richards | B65H 9/166 271/228 |

(Continued)

FOREIGN PATENT DOCUMENTS

| | | |
|---|---|---|
| JP | 2011020832 A | 2/2011 |
| JP | 2023145856 A | 10/2023 |

*Primary Examiner* — David H Banh
(74) *Attorney, Agent, or Firm* — Canon U.S.A., Inc. IP Division

(57) ABSTRACT

A sheet conveyance apparatus includes a sheet supporting portion, a feed roller, a first conveyance roller pair for conveying the sheet and moving the sheet in a lateral direction, a second conveyance roller pair, disposed upstream of the first conveyance roller pair, for conveying the sheet and moving the sheet in the lateral direction, and a control unit. The control unit can execute a first mode for conveying a first sheet, the first mode being configured to move a first sheet in the lateral direction, while nipping the first sheet via the first conveyance roller pair and not nipping the first sheet via the second conveyance roller pair, and a second mode for conveying a second sheet, the second mode being configured to move the second sheet in the lateral direction, while nipping the second sheet via the first conveyance roller pair and the second conveyance roller pair.

13 Claims, 14 Drawing Sheets

(56) References Cited

U.S. PATENT DOCUMENTS

| | | | | |
|---|---|---|---|---|
| 7,731,188 | B2 * | 6/2010 | deJong | B65H 7/02<br>271/265.01 |
| 2009/0152806 | A1 * | 6/2009 | Buddendeck | B65H 9/16<br>271/228 |
| 2011/0018193 | A1 * | 1/2011 | deJong | B65H 9/002<br>271/228 |
| 2019/0023511 | A1 * | 1/2019 | Ishioka | B65H 9/166 |
| 2019/0025750 | A1 * | 1/2019 | Matsumoto | G03G 15/1615 |
| 2022/0002104 | A1 * | 1/2022 | Matsumoto | B65H 7/10 |

* cited by examiner

SHEET CONVEYANCE APPARATUS AND IMAGE FORMING APPARATUS

BACKGROUND

Field

The present disclosure relates to a sheet conveyance apparatus for conveying a sheet and an image forming apparatus for forming an image on the conveyed sheet in a copier, printer, facsimile, multifunction peripheral, or the like having a plurality of functions of these apparatuses.

Description of the Related Art

In the field of commercial printing where a print product output by an image forming apparatus is sold as a product, there has conventionally been a demand for an image forming apparatus having medium extensibility and high productivity.

Particularly to support diverse types of print products, there has been a demand for feeding, for example, a medium called long paper (long sheet) having a size exceeding a standard size.

Japanese Patent Application Laid-Open No. 2011-020832 discusses a skew correction mechanism for correcting a skew of a sheet by obliquely feeding the sheet via an oblique-feed roller pair and bringing a side edge of the sheet into contact with a contact surface along the sheet conveyance direction.

After correcting the skew of the sheet, this skew correction mechanism laterally moves the sheet while nipping its leading edge with a registration roller pair to correct the lateral position of the sheet, adjusts the sheet to a reference position, and conveys the sheet to an image forming unit via the registration roller pair.

The configuration discussed in Japanese Patent Application Laid-Open No. 2011-020832, however, may possibly cause the following problem when laterally moving a sheet which is long in the sheet conveyance direction while nipping the sheet with the registration roller pair.

More specifically, in a state where the trailing edge of the long sheet is nipped by a roller pair upstream of the registration roller pair, the lateral movement of the registration roller pair nipping the leading edge of the long sheet may possibly cause a twisting stress that twists the sheet. If such a twisting stress occurs, the sheet may be creased, folded, or skewed, possibly resulting in a defective image.

In the above-described case, even if the nip portion of the roller pair nipping the long sheet upstream of the registration roller pair is released, the sheet receives a large frictional resistance from a guide member for guiding the sheet. Thus, the twisted sheet causes a stress and may be creased, folded, or skewed, possibly resulting a defective image similarly to the case where the sheet is nipped by the upstream roller pair.

SUMMARY

The present disclosure is directed to providing a sheet conveyance apparatus and an image forming apparatus capable of preventing a long sheet from twisting when nipped by a roller pair and laterally moved.

According to some embodiments, a sheet conveyance apparatus includes a sheet supporting portion configured to stack sheets, a feed roller configured to feed a sheet stacked on the sheet supporting portion, a first conveyance roller pair configured to pinch and convey the sheet fed by the feed roller, and, while nipping the sheet, move the sheet in a lateral direction perpendicular to the sheet conveyance direction to correct a sheet position in the lateral direction, a second conveyance roller pair disposed upstream of the first conveyance roller pair and downstream of the feed roller in the sheet conveyance direction, and configured to nip and convey the sheet, and, while nipping the sheet, move the sheet in the lateral direction to correct the sheet position in the lateral direction, and a control unit configured to control the first conveyance roller pair and the second conveyance roller pair. The control unit is configured to execute a first mode for conveying a first sheet having a first length in the sheet conveyance direction, the first mode being configured to move the first sheet in the lateral direction, while nipping the first sheet via the first conveyance roller pair and not nipping the first sheet via the second conveyance roller pair, to correct a conveyance position in the lateral direction, and a second mode for conveying a second sheet having a second length longer than the first length in the sheet conveyance direction and a distance between the first conveyance roller pair and the second conveyance roller pair in the sheet conveyance direction, the second mode being configured to move the second sheet in the lateral direction, while nipping the second sheet via the first conveyance roller pair and the second conveyance roller pair, to correct the conveyance position in the lateral direction.

An aspect of the present disclosure is an image forming apparatus including the above-described sheet conveyance apparatus, and an image forming unit for forming an image on a sheet conveyed by the sheet conveyance apparatus.

Further features of the present disclosure will become apparent from the following description of exemplary embodiments with reference to the attached drawings.

DESCRIPTION OF THE EMBODIMENTS

Various exemplary embodiments, features, and aspects will now be described below with reference to the accompanying drawings. An overall configuration of an image forming apparatus according to the present exemplary embodiment will be described with reference to FIG. 1, which is a cross-sectional view illustrating the image forming apparatus.

[Image Forming Apparatus]

Figure 1:
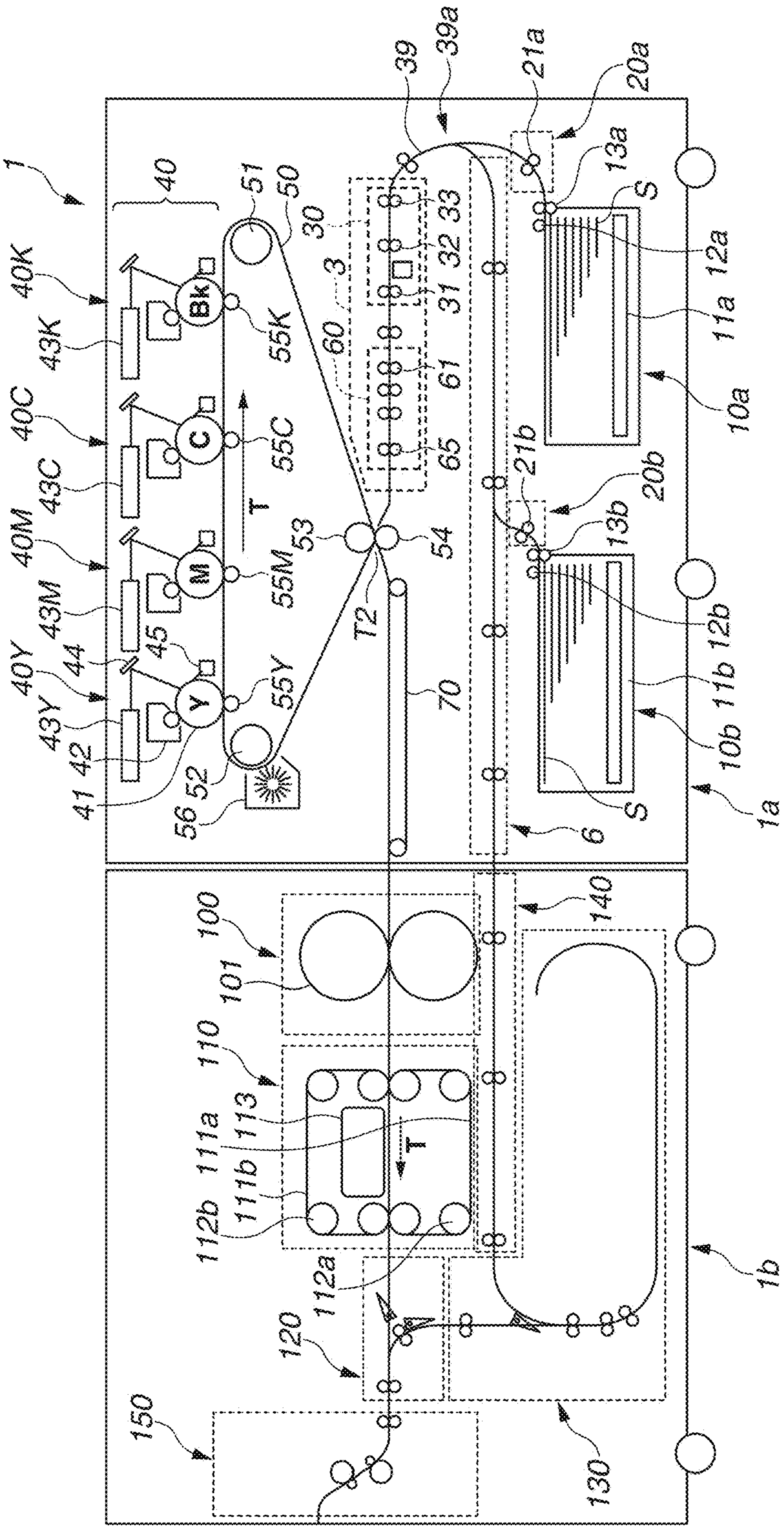
FIG. 1 is a cross-sectional view illustrating a printer according to an exemplary embodiment.

A printer 1 serving as an image forming apparatus is an electrophotographic full color laser beam printer. As illustrated in FIG. 1, the printer 1 includes a housing 1*a* incorporating a sheet conveyance unit and an image forming unit, and a housing 1*b* incorporating a fixing unit and a cooling unit.

The housing 1*a* includes feeding units 10*a* and 10*b*, pulling units 20*a* and 20*b*, a registration unit 3, an image forming unit 40 for forming an image, and a first double-sided conveyance unit 6.

The housing 1*b* includes a fixing unit 100, a cooling unit 110, a branch conveyance unit 120, a reversing conveyance unit 130, a second double-sided conveyance unit 140, and a discharge decurling unit 150.

The image forming unit 40 includes four process cartridges 40Y, 40M, 40C, and 40K for forming images of four different colors, yellow (Y), magenta (M), cyan (C), and black (K), respectively, and four exposure units 43Y, 43M, 43C, and 43K. The four process cartridges 40Y, 40M, 40C, and 40K have the same configuration except that colors of formed images are different. For this reason, the configuration and image forming process of only the process cartridge 40Y will be described below, and descriptions will be omitted for the process cartridges 40M, 40C, and 40K.

The process cartridge 40Y includes a photosensitive drum 41, a charging roller, a development unit 42, and a cleaner 45. The photosensitive drum 41 is formed of an aluminum cylinder with an organic photoconductive layer applied to the outer circumference of the aluminum cylinder, and is rotated by a drive motor. The image forming unit 40 includes an intermediate transfer belt 50 rotated by a drive roller 52 in the direction of the arrow T. The intermediate transfer belt 50 is stretched over a tension roller 51, a drive roller 52, and a secondary transfer inner roller 53. Inside the intermediate transfer belt 50, primary transfer rollers 55Y, 55M, 55C, and 55K are disposed. A secondary transfer outer roller 54 serving as a transfer roller facing the secondary transfer inner roller 53 is disposed outside the intermediate transfer belt 50.

The feeding unit 10*a* includes a lift plate 11*a* serving as a sheet supporting portion that moves up and down with sheets S stacked thereon, a pickup roller 12*a* for feeding the sheets S stacked on the lift plate 11*a* serving as a feed roller, and a separation roller pair 13*a* for separating each of the fed sheets. Likewise, the feeding unit 10*b* includes a lift plate 11*b* serving as a sheet supporting portion that moves up and down with sheets S stacked thereon, a pickup roller 12*b* for feeding the sheets S stacked on the lift plate 11*a*, and a separation roller pair 13*b* for separating each of the fed sheets.

The registration unit 3 serving as an example of a sheet conveyance apparatus includes a first skew correction unit 30 and a second skew correction unit 60 disposed downstream of the first skew correction unit 30. A sheet conveyance path 39 where the sheet S is conveyed in the registration unit 3 is formed in a substantially flat shape. The sheet conveyance path 39 includes a curved portion 39*a* having a substantial U-shape between the feeding units (10*a* and 10*b*) and the registration unit 3. In other words, the sheet conveyance path 39 conveys the sheet S upstream of the pre-registration roller pair 31 in a sheet conveyance direction D1 and includes the curved portion 39*a* having a curved shape when viewed from a lateral direction D2.

The fixing unit 100 disposed on the housing 1*b* includes a fixing roller pair 101 that can be heated. The cooling unit 110 includes an upper cooling belt 111*a* rotated in the direction of the arrow T by upper cooling drive rollers 112*a*. Likewise, the cooling unit 110 includes a lower cooling belt 111*b* rotated in the direction of the arrow T by lower cooling drive rollers 112*b*. The cooling unit 110 also includes a heat sink 113 for cooling the sheet S.

[Image Forming Operation]

An image forming operation of the printer 1 having the above-described configuration will now be described. When an image signal is input from a computer 300 (see FIG. 2), which is an external personal computer (PC) as an example, to the exposure unit 43Y, the exposure unit 43Y irradiates the photosensitive drum 41Y of the process cartridge 40Y with a laser beam corresponding to the image signal.

At this time, the surface of the photosensitive drum 41Y is uniformly charged to a predetermined polarity and potential by the charging roller. When the surface of the photosensitive drum 41 is irradiated with a laser beam by the exposure unit 43Y via a mirror 44, an electrostatic latent image is formed on the surface of the photosensitive drum 41. The electrostatic latent image formed on the photosensitive drum 41 is developed by the development unit 42, and a yellow (Y) toner image is formed on the photosensitive drum 41.

Likewise, the photosensitive drums of the process cartridges 40M, 40C, and 40K are irradiated with a laser beam from the exposure units 43M, 43C, and 43K, and toner images of magenta (M), cyan (C), and black (K) are formed on the photosensitive drums.

The toner images of respective colors formed on the photosensitive drums are transferred to the intermediate transfer belt 50 serving as an example of an image carrier by the primary transfer rollers 55Y, 55M, 55C, and 55K. The full color toner image is conveyed to a secondary transfer nip T2 formed by the secondary transfer inner roller 53 and the secondary transfer outer roller 54, by the intermediate transfer belt 50 rotated by the drive roller 52. The toner remaining on the photosensitive drum 41 is collected by a cleaner 45. The image forming process for each color is performed at the timing when the toner image of the relevant color is overlapped with the upstream toner image primarily transferred on the intermediate transfer belt 50.

In parallel with this image forming process, a sheet S is fed from either one of the feeding units 10*a* and 10*b* and conveyed to the registration unit 3 by either one of the pulling units 20*a* and 20*b*. The registration unit 3 includes the first skew correction unit 30 and the second skew correction unit 60. After the registration unit 3 corrects the positional deviation and skew of the sheet S, the sheet S is conveyed to the secondary transfer nip T2 in synchronization with the timing when the full color toner image formed on the intermediate transfer belt 50 reaches the secondary transfer nip T2. The full color toner image on the intermediate transfer belt 50 is transferred to the first sheet surface (front surface) of the sheet S by a secondary transfer bias voltage applied to the secondary transfer outer roller 54. In other words, the secondary transfer nip T2 is an example of a transfer portion where the toner image carried by the intermediate transfer belt 50 is transferred to the sheet S. Residual toner remaining on the intermediate transfer belt 50 is collected by the belt cleaner 56. The image forming unit 40 thus forms an image on the sheet S conveyed by the registration unit 3 in this way.

The sheet S with the toner images transferred thereto is conveyed to the fixing unit 100 by a pre-fixing conveyance unit 70. The sheet S is then guided to the nip of the fixing roller pair 101 and applied with predetermined heat and pressure, and toner is melted and fixed. The sheet S having passed through the fixing unit 100 is nipped by the upper cooling belt 111*a* and the lower cooling belt 111*b* serving as endless belts in the cooling unit 110. The sheet S is then conveyed by the rotation of the upper cooling drive roller 112*a* and the lower cooling drive roller 112*b*. The sheet S is then brought into contact with the heat sink 113 via the upper cooling belt 111*a* to transfer heat to the heat sink 113 to cool down the sheet S.

Subsequently, the branch conveyance unit 120 performs route selection for selecting whether the sheet S is to be conveyed to the discharge decurling unit 150 or the reversing conveyance unit 130. After the sheet S is conveyed to the reversing conveyance unit 130, the sheet S may also be reversed so that the first sheet surface with an image formed thereon at the secondary transfer nip T2 is downwardly oriented, and conveyed to the discharge decurling unit 150.

When an image is formed on one surface of the sheet S, the sheet S is conveyed from the branch conveyance unit 120 to the discharge decurling unit 150. The curl of the sheet S is then corrected by a hard roller having a small diameter and a soft roller having a large diameter. Subsequently, the sheet S having passed through the discharge decurling unit 150 is discharged out of the apparatus or transferred to a discharge option apparatus.

In a case where an image is formed on both surfaces of the sheet S, the sheet S is conveyed to the reversing conveyance unit 130 by the branch conveyance unit 120, and then reversed on a switchback basis by the reversing conveyance unit 130. The sheet S having been reversed on a switchback basis is conveyed from the reversing conveyance unit 130 to the second double-sided conveyance unit 140 and the first double-sided conveyance unit 6, and then guided to the registration unit 3. Subsequently, an image is formed on the second sheet surface (back surface) at the secondary transfer nip T2. Then, the sheet S passes through the branch conveyance unit 120 and the discharge decurling unit 150, and is discharged out of the apparatus or transferred to a discharge option apparatus.

[Configuration of Control System]

Figure 2:
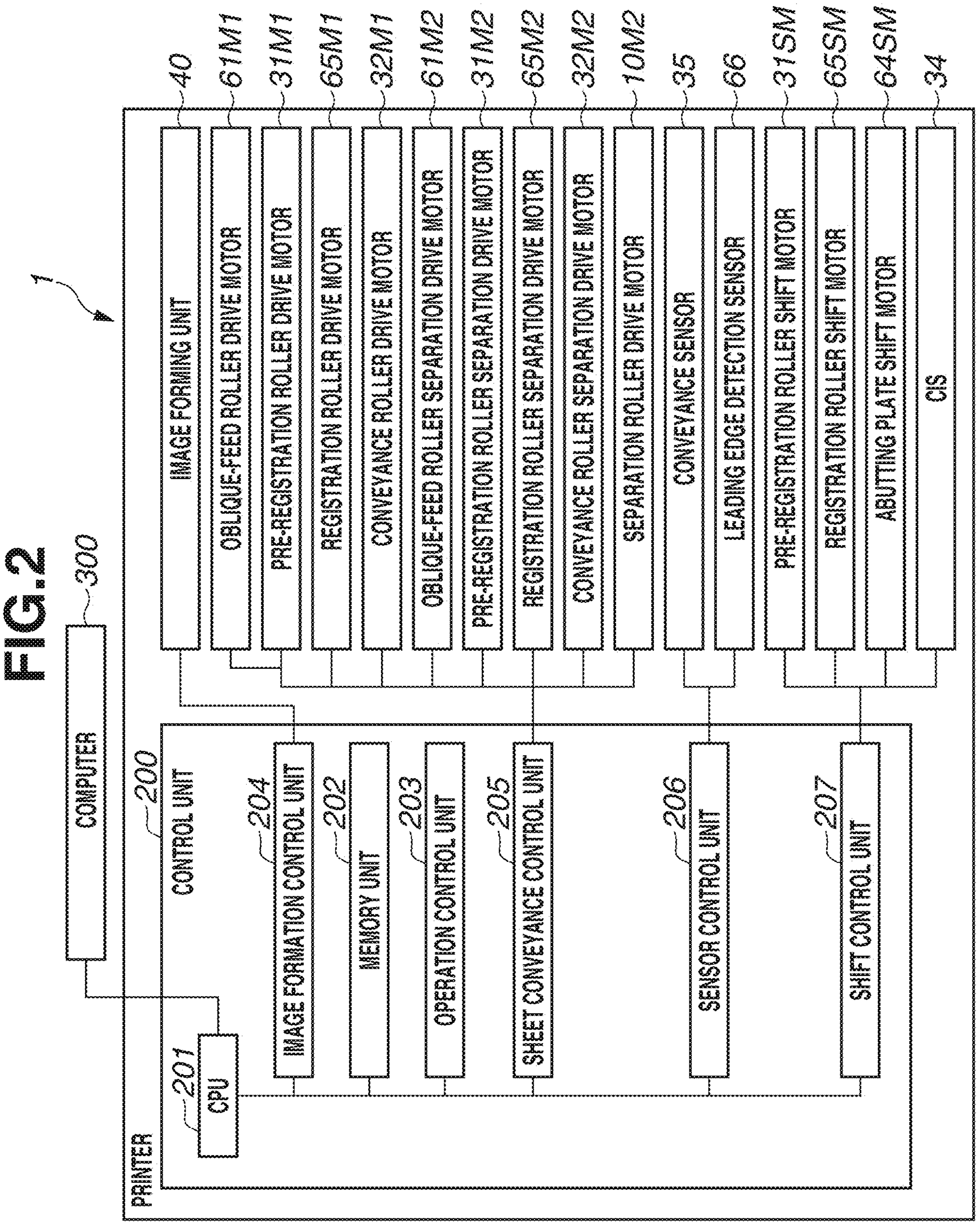
FIG. 2 is a block diagram illustrating a configuration of a printer control system according to the exemplary embodiment.

A configuration of the control system in the printer 1 will now be described with reference to FIG. 2. FIG. 2 is a block diagram illustrating a configuration of the control system of the printer 1 according to the present exemplary embodiment.

The printer 1 includes a control unit 200 connected with the computer 300 and various sensors to enable inputting signals and controlling the image forming unit 40 and various motors.

The control unit 200 includes a central processing unit (CPU) 201, a random access memory (RAM), a read only memory (ROM), and other hardware components. In the control unit 200, these hardware components are configured to implement the functions of a memory unit 202, an operation control unit 203, an image formation control unit 204, a sheet conveyance control unit 205, a sensor control unit 206, and a shift control unit 207.

The memory unit 202 is configured to temporarily store various signals and data. The operation control unit 203 is connected to the operation unit, such as an operation panel, provided on the printer 1, and performs control to input signals from the operation unit and display images. The image formation control unit 204 is connected with the image forming unit 40 to control the image forming unit 40. The image formation control unit 204 sends, for example, image signals included in a print job sent from the computer 300, to the image forming unit 40 and controls each process cartridge to form the toner image on the intermediate transfer belt 50 as described above.

The sheet conveyance control unit 205 is connected with an oblique-feed drive motor 61M1, a pre-registration roller drive motor 31M1, a registration roller drive motor 65M1, a conveyance roller drive motor 32M1, and a separation roller drive motor 10M1 to control these motors.

The oblique-feed drive motor 61M1 drives different drive rollers in a plurality of oblique-feed roller pairs 61, 62, and 63 and freely controls the rotational speeds (sheet conveyance speeds) including the activation and deactivation of the oblique-feed roller pairs 61, 62, and 63.

The pre-registration roller drive motor 31M1 drives the drive roller in the pre-registration roller pair 31 of the registration unit 3. The pre-registration roller drive motor

31M1 freely controls the rotational speed (sheet conveyance speed) including the activation and deactivation of the pre-registration roller pair 31.

The registration roller drive motor 65M1 drives the drive roller in the registration roller pair 65 of the registration unit 3 and freely controls the rotational speed (sheet conveyance speed) including the activation and deactivation of the registration roller pair 65.

The conveyance roller drive motor 32M1 controls drive rollers in a plurality of the conveyance roller pairs 32 and 33 and freely controls the rotational speeds (sheet conveyance speeds) including the activation and deactivation of the conveyance roller pairs 32 and 33. The separation roller drive motor 10M1 drives a separation roller pair 13*c* of the feeding units.

The separation roller drive motor 10M1 freely controls the rotational speed (sheet conveyance speed) including the activation and deactivation of the separation roller pair 13*c*. More specifically, the printer 1 according to the present exemplary embodiment can independently and freely control, with different motors, the rotational speeds of the pre-registration roller pair 31, the registration roller pair 65, the oblique-feed roller pairs 61, 62, and 63, the conveyance roller pairs 32 and 33, and the separation roller pair 13*c*.

The sheet conveyance control unit 205 is connected with and control an oblique-feed separation drive motor 61M2, a pre-registration roller separation drive motor 31M2, a registration roller separation drive motor 65M2, and a conveyance roller separation drive motor 32M2. The oblique-feed separation drive motor 61M2 can switch between a contact state where the drive and driven rollers of the oblique-feed roller pairs 61, 62, and 63 are in contact with each other and a separation state where these rollers are separated. The contact state here refers to a state where the drive and driven rollers of the oblique-feed roller pairs 61, 62, and 63 are brought into contact with each other to form nip portions to enable nipping and conveying the sheet S. The separation state refers to a state where the nip portions of the drive and driven rollers are separated to cancel the nipping of the sheet S. The pre-registration roller separation drive motor 31M2 can switch between a contact state where the nip portion is formed by the drive and driven rollers of the pre-registration roller pair 31 and a separation state where the nip portion is released. The registration roller separation drive motor 65M2 can switch between a contact state where the nip portion is formed by the drive and driven rollers of the registration roller pair 65 and a separation state where the nip portion is released. The conveyance roller separation drive motor 32M2 can switch between a contact state where the nip portions are formed by the drive and driven rollers of the conveyance roller pairs 32 and 33 and a separation state where the nip portions are released. The sheet conveyance control unit 205 controls the drive of these motors to convey the sheet S to the secondary transfer nip T2 in synchronization with the toner image on the intermediate transfer belt 50 while performing the skew correction for the sheet S.

The sensor control unit 206, which is an example of an acquisition unit for acquiring information about the length of the sheet S in the sheet conveyance direction D1, is connected with sensors, such as, a conveyance sensor 35 and a leading edge detection sensor 66, and inputs signals from these sensors. In the registration unit 3, the sensor control unit 206 inputs signals indicating the detection of the leading edge of the sheet S from the conveyance sensor 35 and the leading edge detection sensor 66 to acquire the position and length of the sheet S.

The shift control unit 207 is connected with and control the drive of an abutting plate shift motor 64SM, a pre-registration roller shift motor 31SM, and a registration roller shift motor 65SM. The abutting plate shift motor 64SM controls the drive of an abutting plate 64 in the lateral direction D2 perpendicularly intersecting with the sheet conveyance direction D1. The pre-registration roller shift motor 31SM controls the drive of the pre-registration roller pair 31 in the lateral direction D2. The registration roller shift motor 65SM controls the drive of the registration roller pair 65 in the lateral direction D2.

[Details of Registration Unit]

Figure 3:
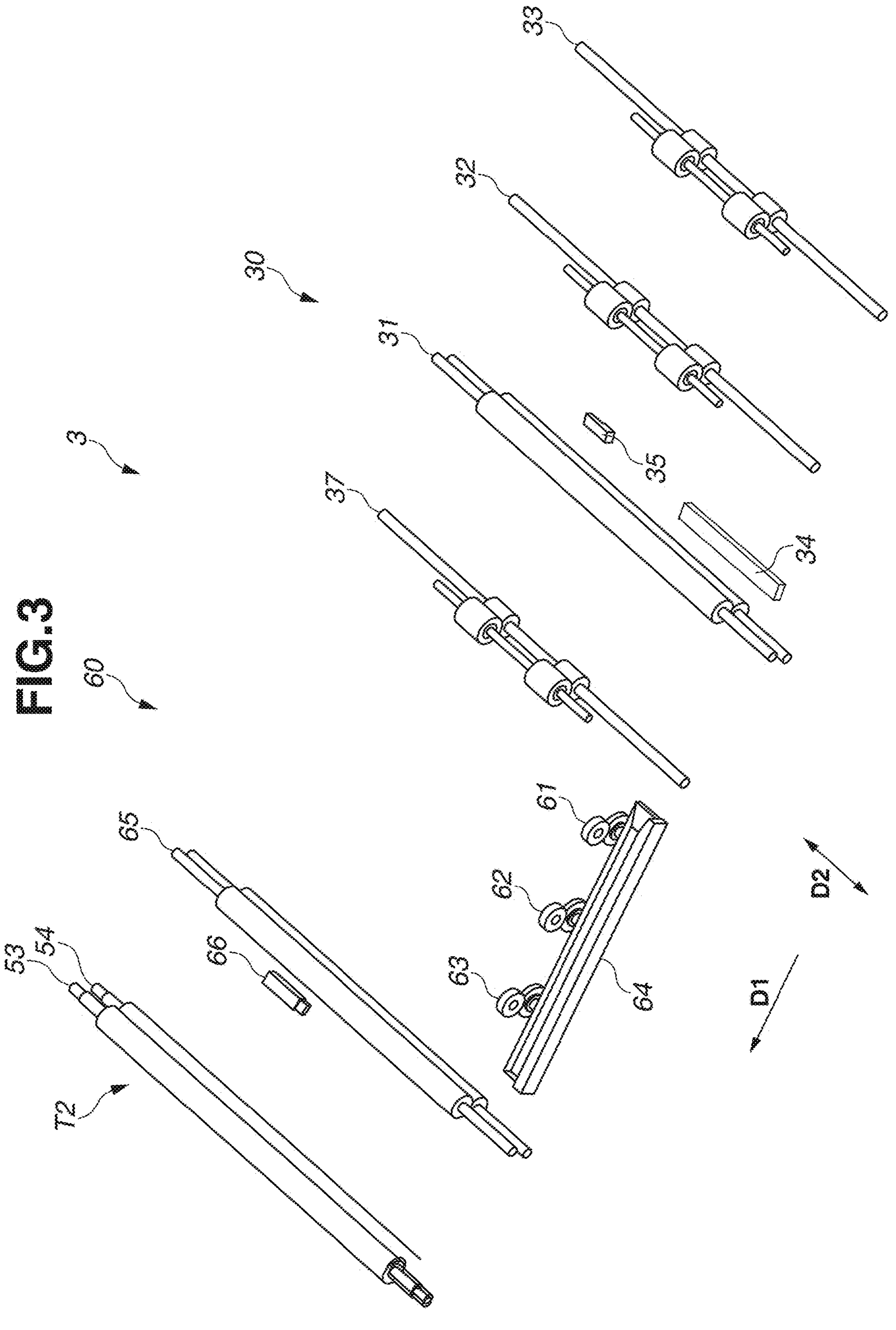
FIG. 3 is a perspective view illustrating a registration unit according to the exemplary embodiment.
Figure 4:
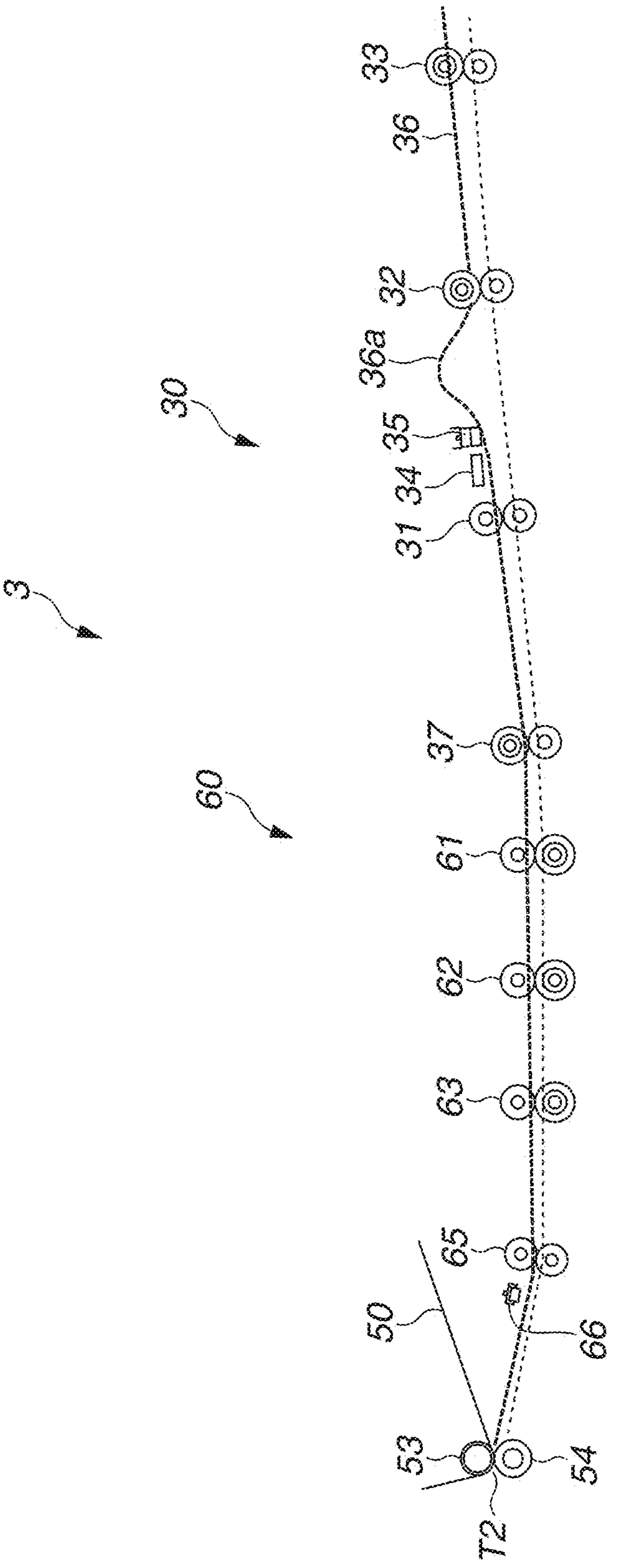
FIG. 4 is a cross-sectional view illustrating the registration unit according to the exemplary embodiment.
Figure 5:
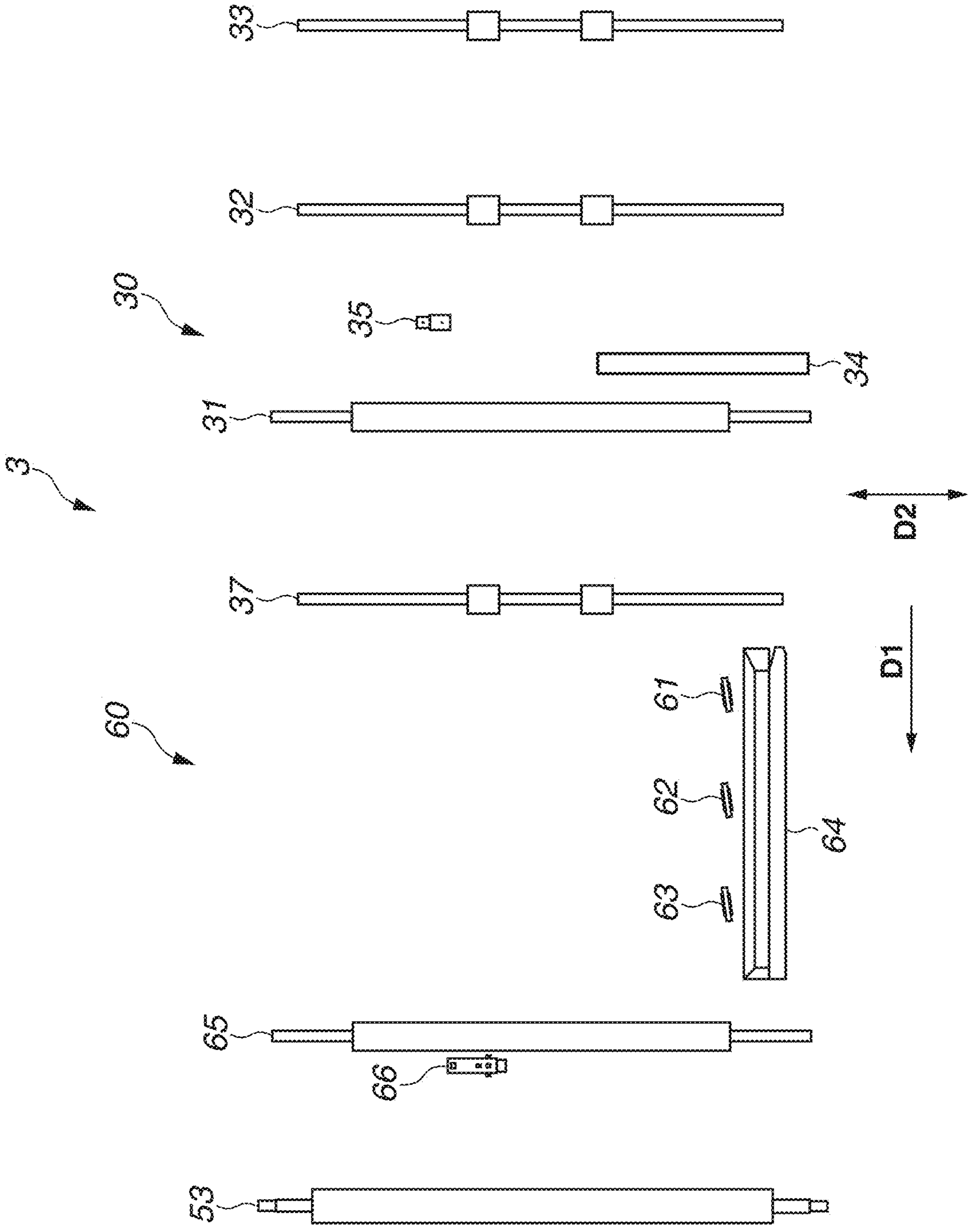
FIG. 5 is a plan view illustrating the registration unit according to the exemplary embodiment.

The configuration of the registration unit 3 according to the present exemplary embodiment will now be described. FIG. 3 is a perspective view, FIG. 4 is a cross-sectional view, and FIG. 5 is a plan view illustrating the registration unit 3. A guide member for guiding the sheet S is omitted.

The following descriptions will be made on the premise that, for example, the printer 1 according to the present exemplary embodiment uses a center-based sheet conveyance method. In this method, for example, the sheet S is conveyed by adjusting the center of the sheet conveyance path in the direction perpendicularly intersecting with the sheet conveyance direction D1 to the center of the sheet S in the sheet lateral direction D2. The registration unit 3 includes the first skew correction unit 30 and the second skew correction unit 60. The first skew correction unit 30 is disposed upstream of the second skew correction unit 60 in the sheet conveyance direction D1.

The first skew correction unit 30 includes the pre-registration roller pair 31, the conveyance roller pairs 32 and 33, a contact image sensor (CIS) 34, the conveyance sensor 35 serving as a reflection type photo interrupter, and a conveyance guide 36. The pre-registration roller pair 31, which is an example of a second roller pair, is disposed upstream of the registration roller pair 65 in the sheet conveyance direction D1, nips and conveys the sheet S. The pre-registration roller pair 31 can move the sheet S in the lateral direction D2 while nipping the sheet S to correct the position of the sheet S in the lateral direction D2. The conveyance roller pair 32 is an example of a third roller pair for conveying the sheet S, disposed upstream of the pre-registration roller pair 31 in the sheet conveyance direction D1. The conveyance roller pair 33 is an example of a fourth roller pair for conveying the sheet S, disposed upstream of the conveyance roller pair 32 in the sheet conveyance direction D1.

After the leading edge of the sheet S conveyed by the conveyance roller pairs 32 and 33 comes into contact with the nip portion of the pre-registration roller pair 31, the first skew correction unit 30 forms a deflection on the sheet S to correct the skew of the leading edge of the sheet S. Thereafter, the first skew correction unit 30 can perform a first skew correction operation in which the pre-registration roller pair 31 starts rotating to convey the sheet S.

Each of the roller pairs nips the sheet S with the drive and driven rollers and conveys the sheet S downstream in the sheet conveyance direction D1. More specifically, each of the pre-registration roller pair 31 and the conveyance roller pairs 32 and 33 can switch between a contact state where each roller pair forms a nip portion to nip and convey the sheet S and a separation state where the nip portion is released to cancel the nipping of the sheet S.

Each drive roller receives a drive from the drive motors 31M1 and 32M1 and the transmission gears to obtain power for rotating to convey the sheet S in the conveyance direction. Each roller pair receives the drive from the separation drive motors 31M2 and 32M2 and the transmission gears to separate and release the nip portion of the roller pair.

The pre-registration roller pair 31 can be moved in the lateral direction D2 perpendicularly intersecting with the sheet conveyance direction D1 by the pre-registration roller shift motor 31SM and the transmission gears, and change the position according to the length of the sheet S in the lateral direction D2.

The CIS 34, which is an example of a detection unit, is disposed upstream of the pre-registration roller pair 31 to detect the side edge position of the conveyance position of the conveyed sheet S in the lateral direction D2. The CIS 34 is disposed at a position deviated to one side from the center of the sheet S in the lateral direction D2. This is because one side edge position of the sheet S is preferably detected in correcting the position of the sheet S in the lateral direction D2. The CIS 34 is configured to detect the side edge positions of the sheet S having the minimum length in the lateral direction D2 and the sheet S having the maximum length in the lateral direction D2 among sheet sizes that can be used by the printer 1 according to the present exemplary embodiment.

The second skew correction unit 60 includes the oblique-feed roller pairs 61, 62, and 63, the abutting plate 64, the registration roller pair 65, the leading edge detection sensor 66, and the conveyance guide. The abutting plate 64 extends along the sheet conveyance direction D1 and is an example of a contact surface that comes into contact with the edge portion of the sheet S in the lateral direction D2. The registration roller pair 65 is disposed downstream of the oblique-feed roller pairs 61, 62, and 63 in the sheet conveyance direction D1. The registration roller pair 65, which is an example of a first roller pair, nips and conveys the sheet S. The registration roller pair 65 can also move the sheet S in the lateral direction D2 while nipping the sheet S to correct the position of the sheet S in the lateral direction D2. As the sheet S advances downstream in the sheet conveyance direction D1, the oblique-feed roller pairs 61, 62, and 63 move the sheet S in a direction inclined relative to the sheet conveyance direction D1 so that the sheet S approaches the abutting plate 64 in the lateral direction D2. The second skew correction unit 60 can perform a second skew correction operation for moving the sheet S along the abutting plate 64 to correct the skew of the sheet S during sheet conveyance.

Each roller pair nips the sheet S with the drive and driven rollers and conveys the sheet S downstream in the sheet conveyance direction D1. More specifically, the oblique-feed roller pairs 61, 62, and 63 and the registration roller pair 65 can switch between a contact state where each roller pair forms a nip portion to nip and convey the sheet S and a separation state where the nip portion is released to cancel the nipping of the sheet S.

Each drive roller receives a drive from the drive motors 61M1 and 65M1 and the transmission gears to obtain power for rotating to convey the sheet S in the conveyance direction. When each roller pair receives the drive from the separation drive motors 61M2 and 65M2 and the transmission gears, the roller pair is separated to release the nip portion. The registration roller pair 65 can be moved in the lateral direction D2 perpendicularly intersecting with the sheet conveyance direction D1 by the registration roller shift motor 65SM and the transmission gears to change the position according to the length of the sheet S in the lateral direction D2. The abutting plate 64 can be moved in the lateral direction D2 by the abutting plate shift motor 64SM and the transmission gears to change the position according to the length of the sheet S in the lateral direction D2.

The secondary transfer nip T2 formed by the intermediate transfer belt 50 is disposed downstream of the registration roller pair 65, where an image is transferred to the sheet S. More specifically, the second skew correction unit 60 is disposed upstream of the image forming unit 40 in the sheet conveyance direction D1, and the registration unit 3 conveys the sheet S to the secondary transfer nip T2. According to the present exemplary embodiment, a conveyance roller pair 37 and a conveyance guide are disposed between the first skew correction unit 30 and the second skew correction unit 60. However, the conveyance roller pair 37 and the conveyance guide may be omitted by disposing the first skew correction unit 30 and the second skew correction unit 60 to be close to each other.

[Operation Modes]

The control unit 200 can switch the operation mode between a case of conveying a long sheet and a case of conveying a non-long sheet. A non-long sheet here means a sheet of a standard size having a length of 26 inches or less in the sheet conveyance direction D1, such as the A4 size. However, the length of a non-long sheet is not limited thereto. A non-long sheet is an example of a first sheet having a first length in the sheet conveyance direction D1. A long sheet is an example of a second sheet having a second length in the sheet conveyance direction D1 which is larger than the first length and larger than the distance between the registration roller pair 65 and the pre-registration roller pair 31 in the sheet conveyance direction D1.

According to the present exemplary embodiment, the length of a long sheet is such that, when the downstream edge of the sheet in the sheet conveyance direction D1 is nipped by the registration roller pair 65, the upstream edge of the sheet is positioned at the curved portion 39*a*. The length of a non-long sheet is such that, when the downstream edge of the sheet in the sheet conveyance direction D1 is nipped by the registration roller pair 65, the upstream edge of the sheet is positioned downstream of the curved portion 39*a*. Thus, in the lateral registration correction for a non-long sheet in which the sheet is moved in the lateral direction, the upstream side of the sheet is positioned at the flat portion of the sheet conveyance path 39, thereby providing a small resistance to the movement in the lateral direction D2 with respect to the conveyance guide 36. The sheet S is therefore hardly twisted even when moved in the lateral direction only via the registration roller pair 65. In contrast, in the lateral registration correction for a long sheet in which the sheet is moved in the lateral direction, the upstream side of the sheet S is positioned at the curved portion 39*a*, and thus providing a large resistance to the movement in the lateral direction D2 relative to the conveyance guide 36. Thus, the sheet S may possibly be twisted when moved in the lateral direction only via the registration roller pair 65.

When conveying a non-long sheet, the control unit 200 can perform a first mode of moving the sheet S in the lateral direction D2 while nipping the sheet S via the registration roller pair 65 and not nipping the sheet S via the pre-registration roller pair 31, thus correcting the sheet conveyance position in the lateral direction D2. When conveying a long sheet, the control unit 200 can perform a second mode of moving the sheet S in the lateral direction D2 while nipping the sheet S via the registration roller pair 65 and the pre-registration roller pair 31, thus correcting the sheet conveyance position in the lateral direction D2. This enables preventing the sheet S from being twisted to a further extent than in a case where a long sheet is moved in the lateral direction D2 using only the registration roller pair 65.

[Registration Correction (Non-Long Sheet)]

The registration correction for a non-long sheet will be described below. The control unit 200 controls the first skew correction unit 30 and the second skew correction unit 60 based on information about the length of the sheet S acquired by the sensor control unit 206.

FIGS. 6A to 9B illustrate the skew correction operation for the sheet S as a non-long sheet in time series. FIGS. 6A, 7A, 8A, and 9A are plan views illustrating the registration unit 3, and FIGS. 6B, 7B, 8B, and 9B are side views illustrating the registration unit 3. Referring to the plan views of the rollers illustrated in FIGS. 6A, 7A, 8A, and 9A, the solid black rollers indicate rollers in the contact state where nip portions are formed to enable nipping and conveying the sheet S, and the white rollers indicate rollers in the separation state where the nip portions are released to cancel the nipping of the sheet S.

Figure 6A:
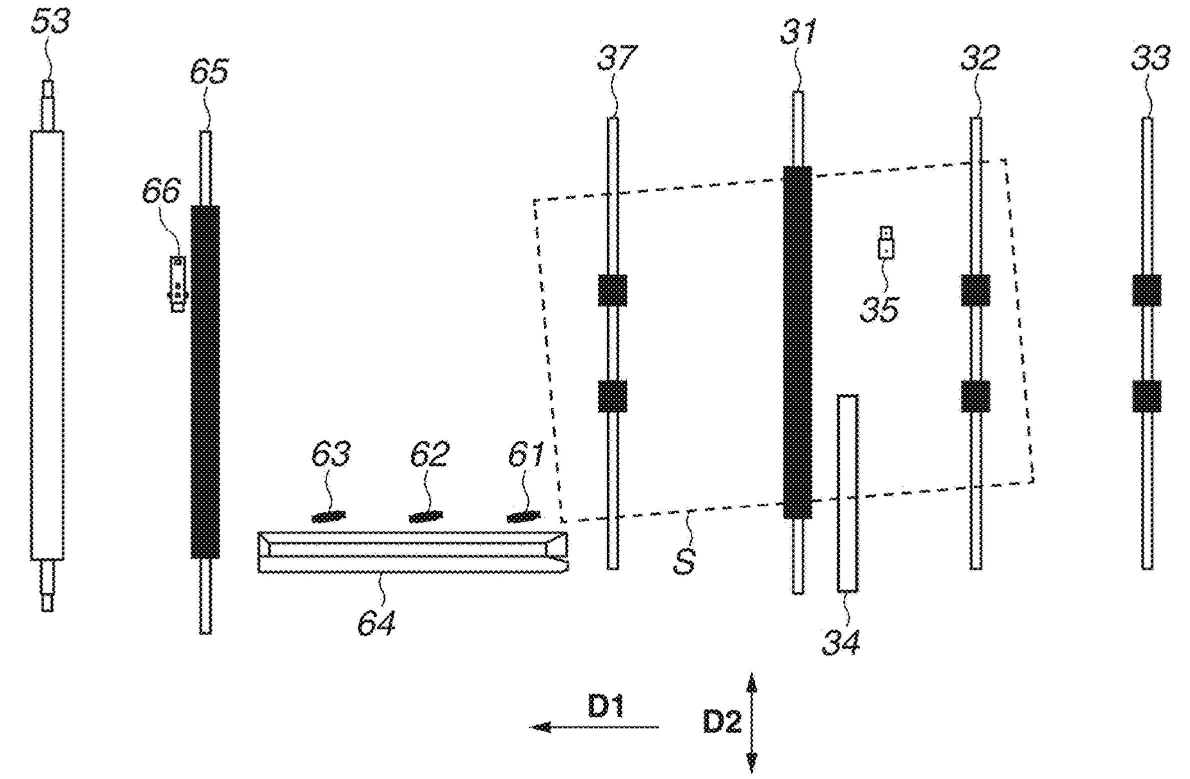
FIG. 6A is a plan view illustrating the registration unit according to the exemplary embodiment in a case where the leading edge of a non-long sheet reaches a second skew correction unit.
Figure 6B:
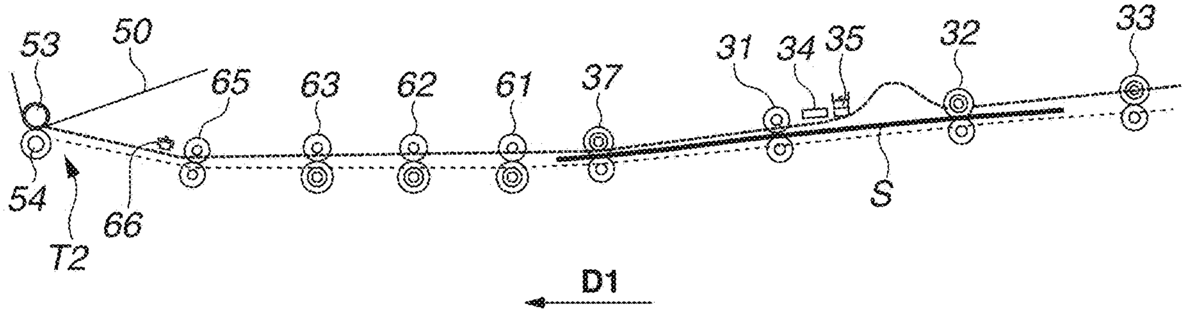
FIG. 6B is a cross-sectional view illustrating the registration unit according to the exemplary embodiment in a case where the leading edge of a non-long sheet reaches the second skew correction unit.

As illustrated in FIGS. 6A and 6B, the control unit 200 sets the pre-registration roller pair 31 to the contact state to convey the sheet S. When the sheet S reaches the oblique-feed roller pairs 61, 62, and 63 in a skewed state, one edge of the sheet S is brought into contact with the abutting plate 64 by the forces of the oblique-feed roller pairs 61, 62, and 63 in the lateral direction D2.

Figure 7A:
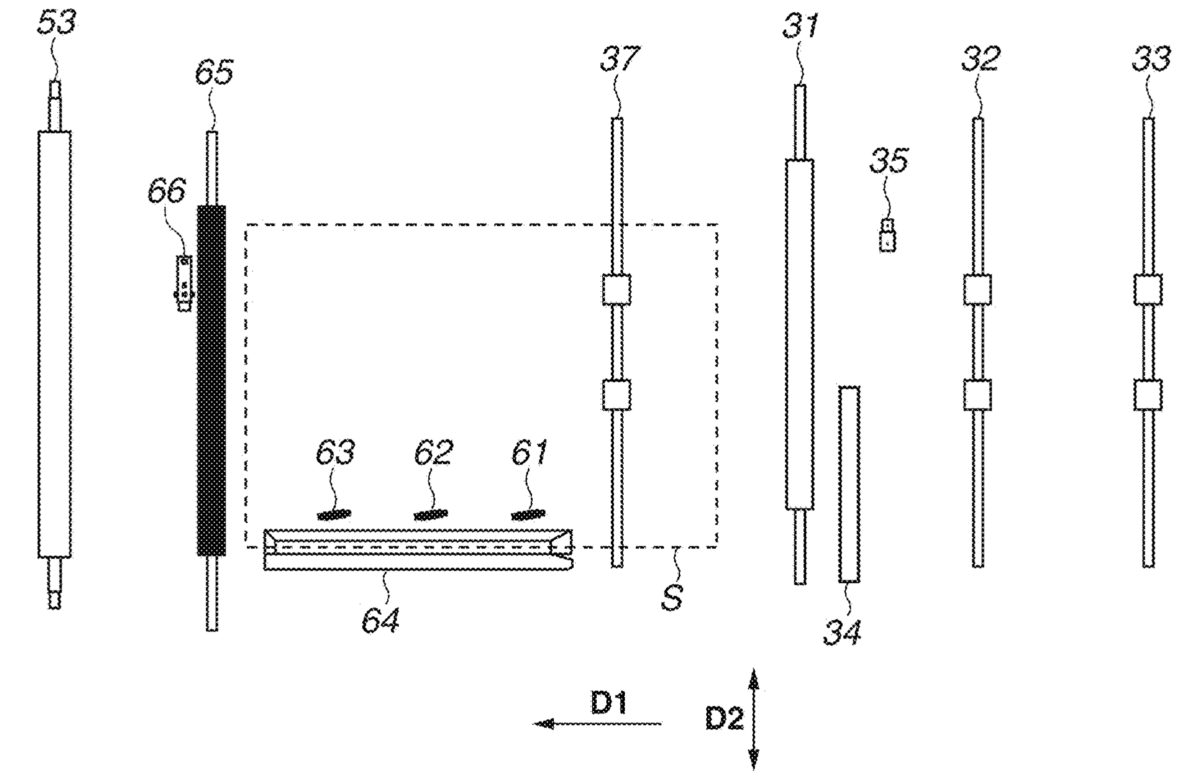
FIG. 7A is a plan view illustrating the registration unit according to the exemplary embodiment in a case where skew correction is made on a non-long sheet by the second skew correction unit.
Figure 7B:
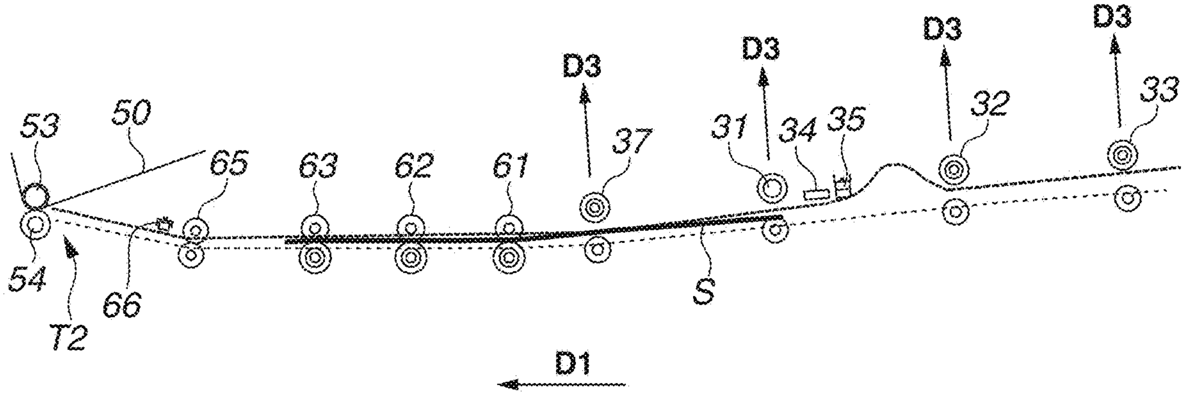
FIG. 7B is a cross-sectional view illustrating the registration unit according to the exemplary embodiment in a case where skew correction is made on a non-long sheet by the second skew correction unit.

As illustrated in FIGS. 7A and 7B, when one edge of the sheet S is brought into contact with the abutting plate 64 by the oblique-feed roller pairs 61, 62, and 63, the oblique-feed roller pairs 61, 62, and 63 receive a reactive force due to the contact pressure of the sheet S against the abutting plate 64. As the sheet S slips to be rotated, the skew is corrected while the side edge of the sheet S is moving along the abutting plate 64. The position of the abutting plate 64 is adjusted based on edge position information for the sheet S read by the CIS 34 disposed upstream of the oblique-feed roller pairs 61, 62, and 63. After the leading edge of the sheet S reaches the oblique-feed roller pairs 61, 62, and 63, the control unit 200 releases the nip portion of the pre-registration roller pair 31 in the direction D3 to set the nip portion in the separation state. After the leading edge of the sheet S having been conveyed by the pre-registration roller pair 31 reaches the oblique-feed roller pairs 61, 62, and 63, the control unit 200 separates the conveyance roller pairs 32 and 33 in the direction D3 to set the conveyance roller pairs 32 and 33 in the separation state. More specifically, when correcting a skew by using the oblique-feed roller pairs 61, 62, and 63, the pre-registration roller pair 31 and the conveyance roller pairs 32, 33, and 37 on the upstream side are separated in the direction D3 so that the nip portions are released in advance. If the pre-registration roller pair 31 and the conveyance roller pairs 32, 33, and 37 are all set to the separation state, the sheet S does not receive resistance caused by being nipped by the rollers while moving in the lateral direction D2 or rotating, thus preventing the sheet S from being creased or folded.

Figure 8A:
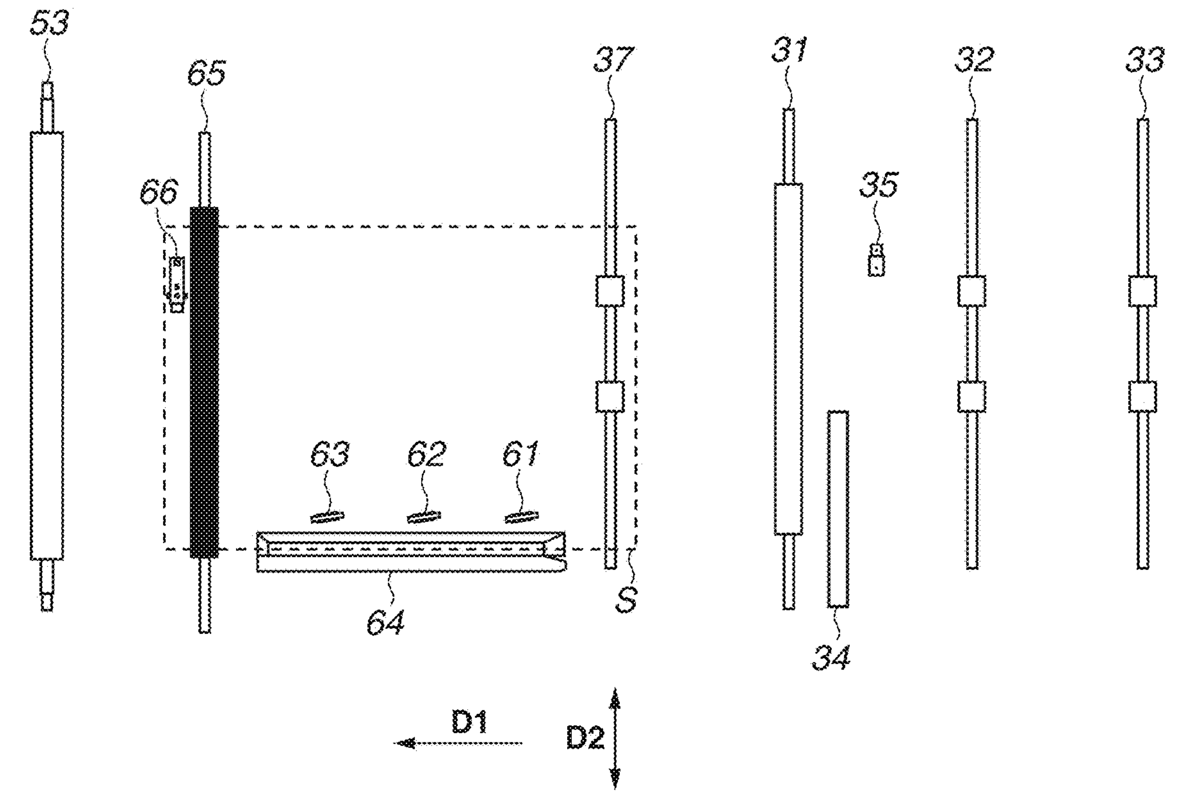
FIG. 8A is a plan view illustrating the registration unit according to the exemplary embodiment in a case where the leading edge of a non-long sheet is nipped by a registration roller pair.
Figure 8B:
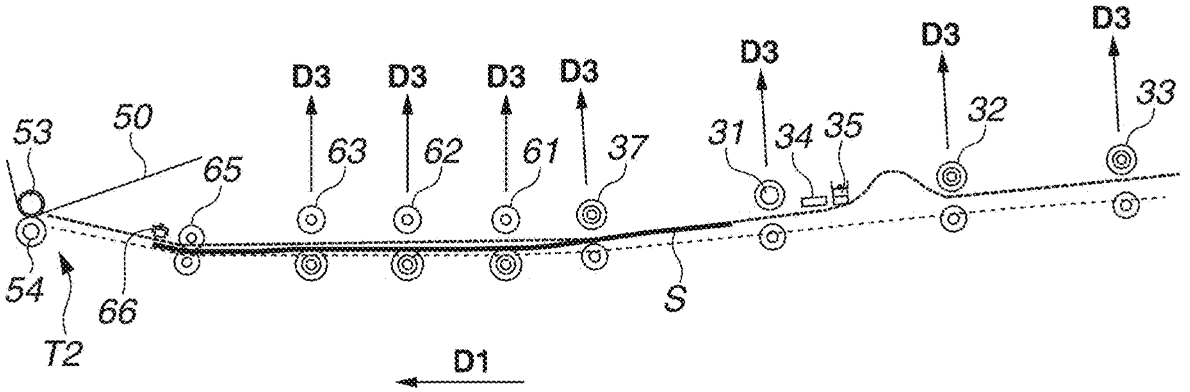
FIG. 8B is cross-sectional view illustrating the registration unit according to the exemplary embodiment in a case where the leading edge of a non-long sheet is nipped by the registration roller pair.

As illustrated in FIGS. 8A and 8B, when the leading edge of the sheet S reaches the registration roller pair 65, the control unit 200 shifts the registration roller pair 65 in the lateral direction D2 so that the position of the sheet S in the lateral direction D2 coincides with the position of the image conveyed to the secondary transfer nip T2 in the lateral direction D2. According to the present specification, the lateral direction D2 refers to the lateral direction, the movement in the lateral direction D2 is also referred to as a lateral shift, and the registration in the lateral direction is also referred to as lateral registration. In this case, the sheet S is subjected to a lateral shift while being conveyed by the registration roller pair 65. Alternatively, the conveyance of the sheet S may be temporarily stopped before the lateral shift. Further, the control unit 200 compares the result of detecting the leading edge of the sheet S in the conveyance direction by the leading edge detection sensor 66 with the timing of the image conveyed to the secondary transfer nip T2. Then, the control unit 200 controls the speed, timing, or both of the registration roller pair 65 so that the image coincides with the leading edge position of the sheet S. In a case where the control unit 200 shifts the lateral registration of the sheet S, the control unit 200 also separates the oblique-feed roller pairs 61, 62, and 63 in the direction D3 to release their nip portions, thus preventing an excessive force from being applied to the sheet S.

Figure 9A:
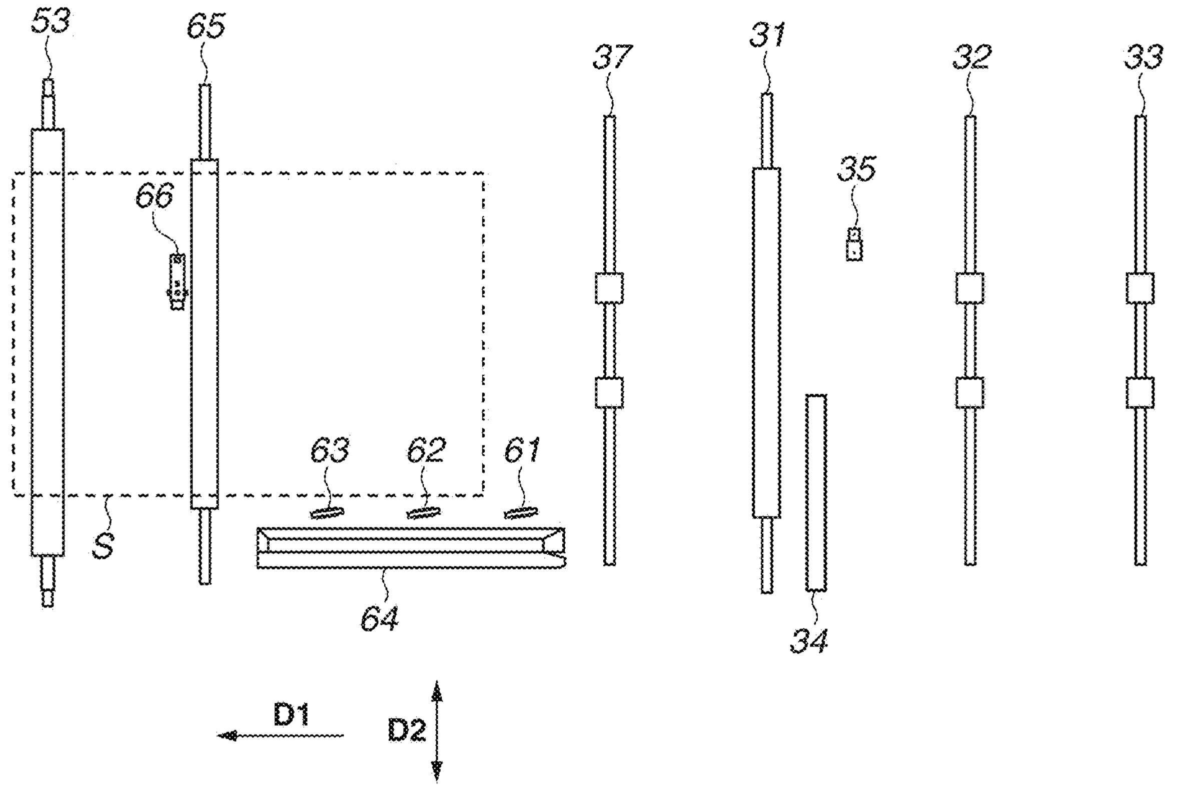
FIG. 9A is a plan view illustrating the registration unit according to the exemplary embodiment in a case where the leading edge of a non-long sheet reaches a secondary transfer nip.
Figure 9B:
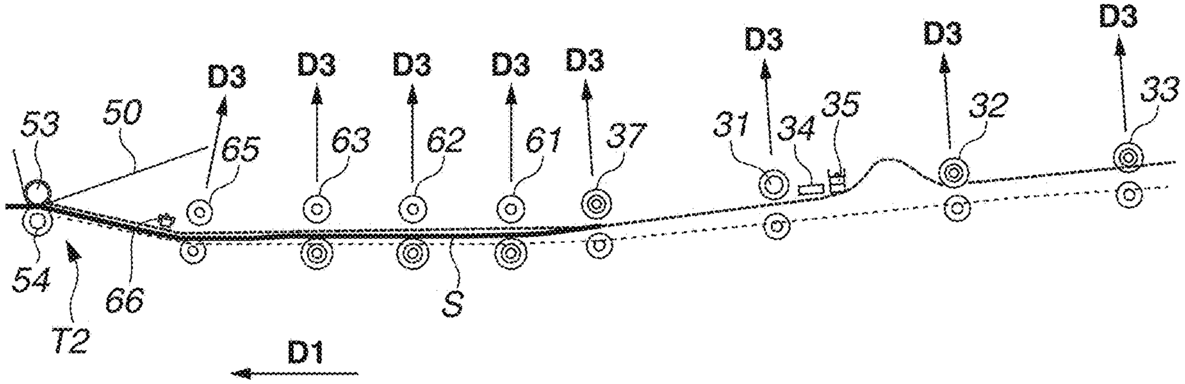
FIG. 9B is a cross-sectional view illustrating the registration unit according to the exemplary embodiment in a case where the leading edge of a non-long sheet reaches the secondary transfer nip.

As illustrated in FIGS. 9A and 9B, when the sheet S is conveyed to the secondary transfer nip T2, the registration roller pair 65 also separates in the direction D3, and all of the upstream roller pairs are set in the separation state where their nip portions are released. When all of the upstream roller pairs are separated in the direction D3, the secondary transfer nip T2 no longer receives forces from the roller pairs via the sheet S, making it possible to convey the sheet S while accurately transferring an image to the sheet S. More specifically, when conveying a non-long sheet having a length in the sheet conveyance direction D1 of a predetermined value or less (e.g., 26 inches or less), the control unit 200 performs the second skew correction operation for moving the sheet S along the abutting plate 64 via the second skew correction unit 60 to correct the skew of the sheet S. In the second skew correction operation by the second skew correction unit 60, the control unit 200 causes the registration roller pair 65 to nip the sheet S having been moved along the abutting plate 64. The control unit 200 then executes the first mode by correcting the position of the sheet S nipped by the registration roller pair 65 in the lateral direction D2 via the registration roller shift motor 65SM. Further, when conveying a non-long sheet, the control unit 200 changes the sheet conveyance speed via the registration roller pair 65 at a timing corresponding to the image formation by the image forming unit 40 in the second skew correction operation by the second skew correction unit 60. The relevant timing refers to, for example, the timing when the toner image reaches the secondary transfer nip T2.

A difference between a long sheet and a non-long sheet will now be described. For example, if the upstream roller pair cannot be separated for a certain reason in correcting a skew via the oblique-feed roller pairs 61, 62, and 63, the sheet S cannot be conveyed in a slip way and brought into contact with the abutting plate 64. More specifically, the skew correction or lateral registration correction cannot be performed by obliquely feeding the sheet S via the oblique-feed roller pairs 61, 62, and 63. Thus, the difference between a long sheet and a non-long sheet is whether the length of the sheet S in the sheet conveyance direction D1 is longer than the distance from the oblique-feed roller pair 61 to the conveyance roller pair 33 disposed most upstream out of the separable roller pairs. More specifically, the difference is whether the sheet length allows skew correction by using the oblique-feed roller pairs 61, 62, and 63. According to the present exemplary embodiment, it is assumed that a sheet having a length of 26 inches or less is a non-long sheet, and a sheet having a length exceeding 26 inches is a long sheet.

[Registration Correction (Long Sheet)]

The registration correction for a long sheet will now be described. FIGS. 10A to 13B illustrate the skew correction operation for the sheet S as a non-long sheet. FIGS. 10A, 11A, 12A, and 13A are plan views illustrating the registration unit 3, and FIGS. 10B, 11B, 112B, and 13B are side views illustrating the registration unit 3.

Referring to the plan views of the rollers illustrating in FIGS. 10A, 11A, 12A, and 13A, the solid black rollers indicate rollers in the contact state where nip portions are formed to enable nipping and conveying the sheet S, and the white rollers indicate rollers in the separation state where the nip portions are released to cancel the nipping of the sheet S.

Figure 10A:
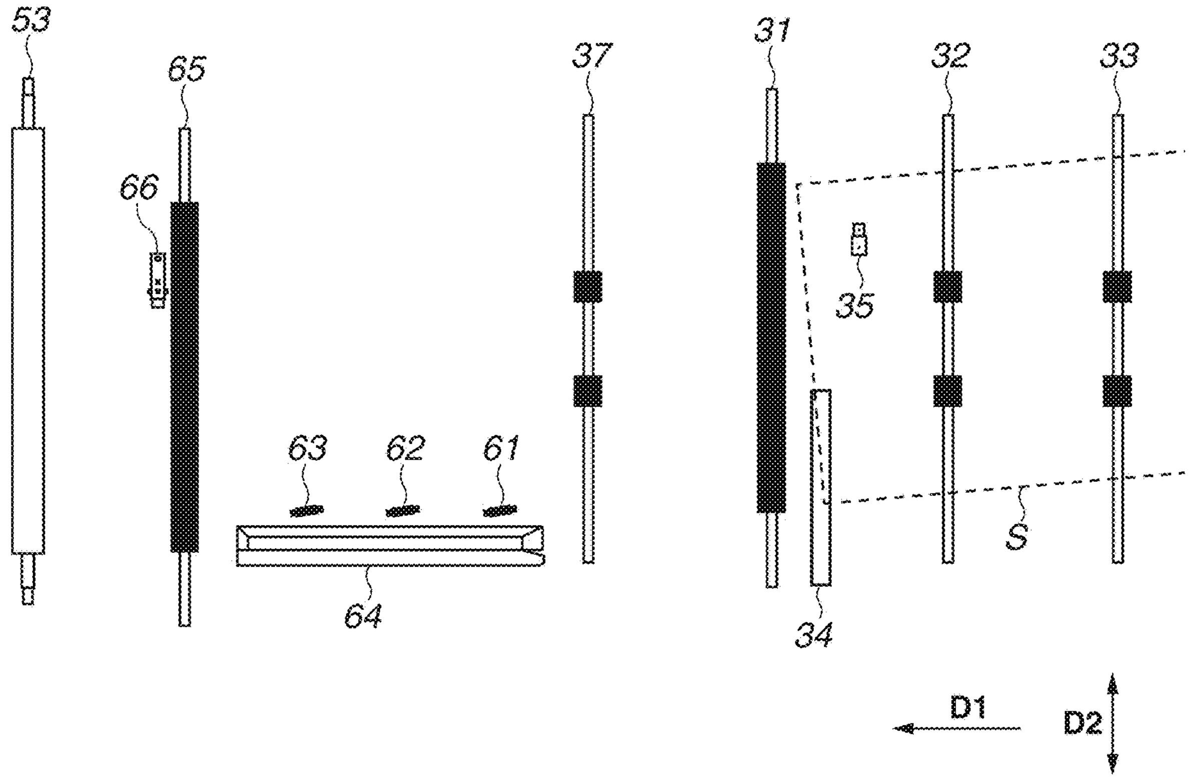
FIG. 10A is a plan view illustrating the registration unit according to the exemplary embodiment in a state immediately before the leading edge of a long sheet reaches a pre-registration roller pair.
Figure 10B:
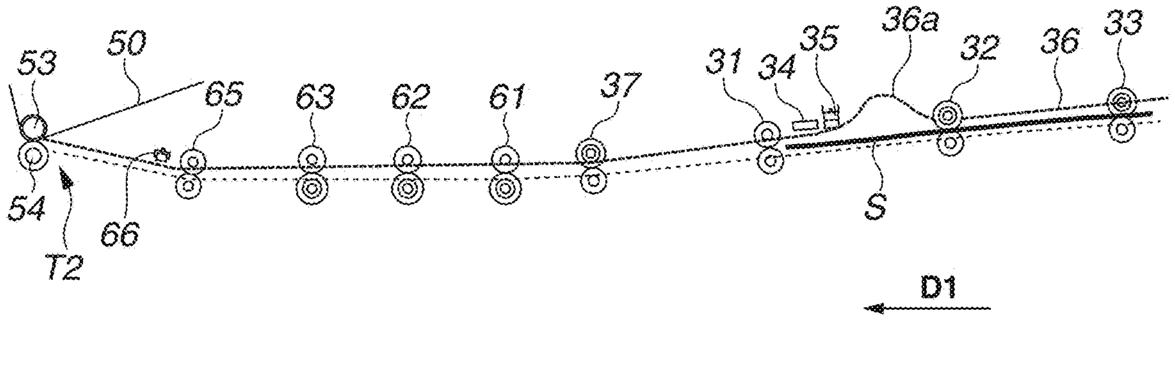
FIG. 10B is cross-sectional view illustrating the registration unit according to the exemplary embodiment in a state immediately before the leading edge of a long sheet reaches the pre-registration roller pair.

A case where the long sheet S is conveyed in the registration unit 3 in a skewed state, as illustrated in FIGS. 10A and 10B, will now be described. For a long sheet, the skew correction or lateral registration correction cannot be performed via the oblique-feed roller pairs 61, 62, and 63. Thus, the control unit 200 performs the skew correction by bringing the leading edge of the sheet S into contact with the pre-registration roller pair 31.

Figure 11A:
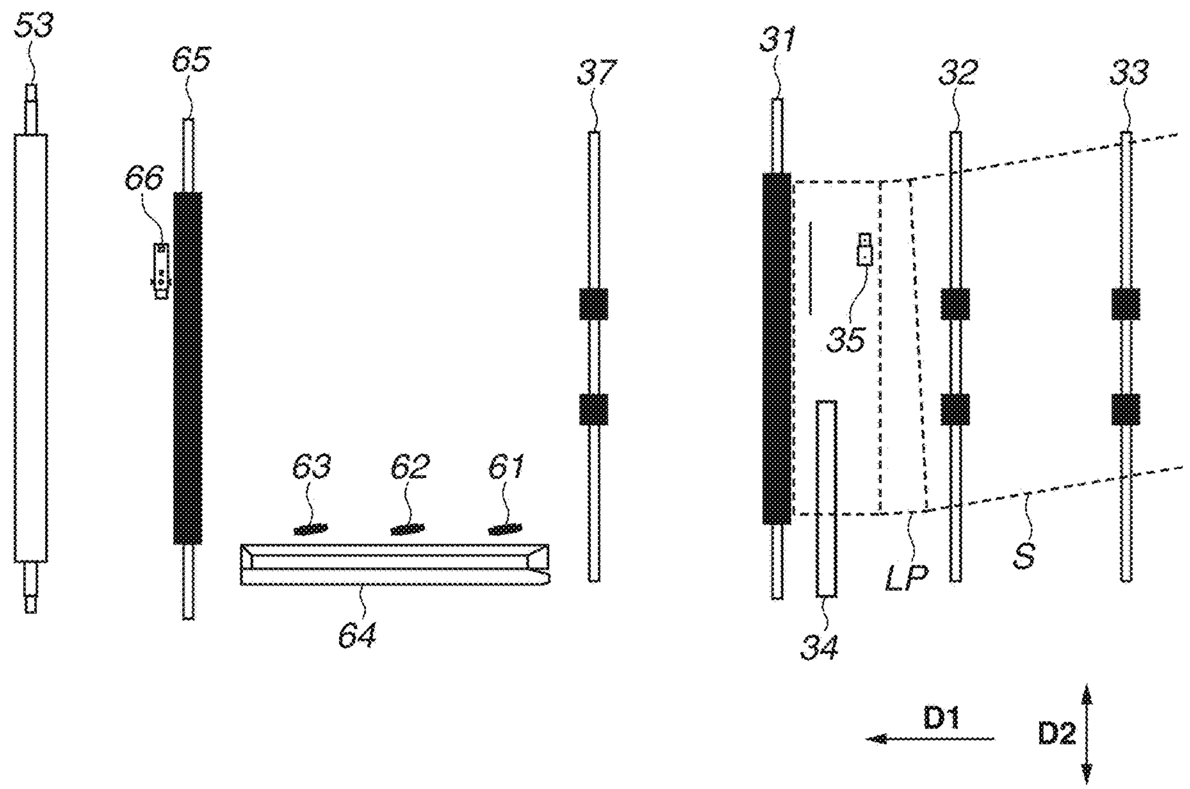
FIG. 11A is a plan view illustrating the registration unit according to the exemplary embodiment in a state where the leading edge of a long sheet reaches the pre-registration roller pair to form a loop.
Figure 11B:
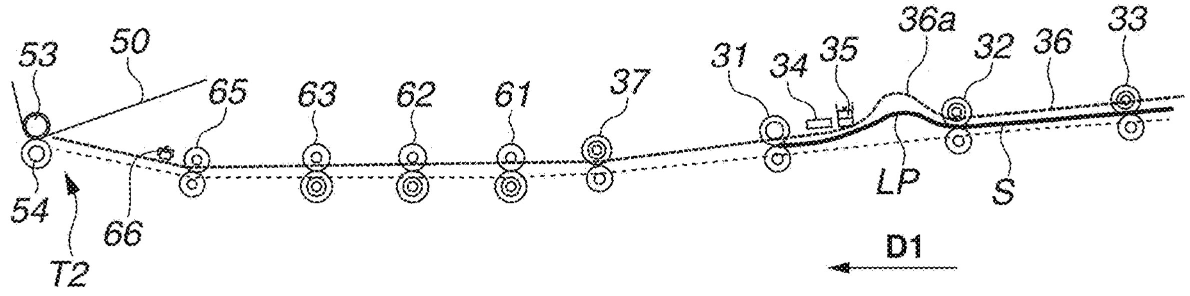
FIG. 11B is a cross-sectional view illustrating the registration unit according to the exemplary embodiment in a state where the leading edge of a long sheet reaches the pre-registration roller pair to form a loop.

As illustrated in FIGS. 11A and 11B, the leading edge of the sheet S comes into contact with the nip portion of the pre-registration roller pair 31 in a stop state. At this timing, the conveyance roller pairs 32 and 33 upstream of the pre-registration roller pair 31 are driven, the sheet S forms a deflection (loop) LP between the pre-registration roller pair 31 and the conveyance roller pair 32, as illustrated in FIGS. 10A and 10B. Upon reception of a reactive force of the formed loop LP, the leading edge of the sheet S is rotated centering on the pre-registration roller pair 31, and the leading edge position of the sheet S is subjected to skew correction along the axial direction of the pre-registration roller pair 31 (i.e., the lateral direction D2). Thereafter, the control unit 200 drives the pre-registration roller pair 31 again to convey the sheet S downstream.

The conveyance guide 36, which is an example of a guide member positioned upstream of the pre-registration roller pair 31 in the sheet conveyance direction D1, is provided with a deflection space 36*a* serving as a loop space that partially extends the cross-section of the conveyance portion. The deflection space 36*a* is an example of a space forming portion. When the leading edge of the sheet S conveyed by the conveyance roller pair 32 comes into contact with the pre-registration roller pair 31, a space for forming a deflection of the sheet S is formed. This prevents the sheet S from being creased or folded when the sheet S forms a loop LP serving as a deflection (curved portion). According to the present exemplary embodiment, the sheet conveyance path of the first skew correction unit 30 is substantially horizontal, and a deflection space 36*a* is disposed above the sheet conveyance path. However, the deflection space 36*a* may be disposed under the sheet conveyance path.

Figure 12A:
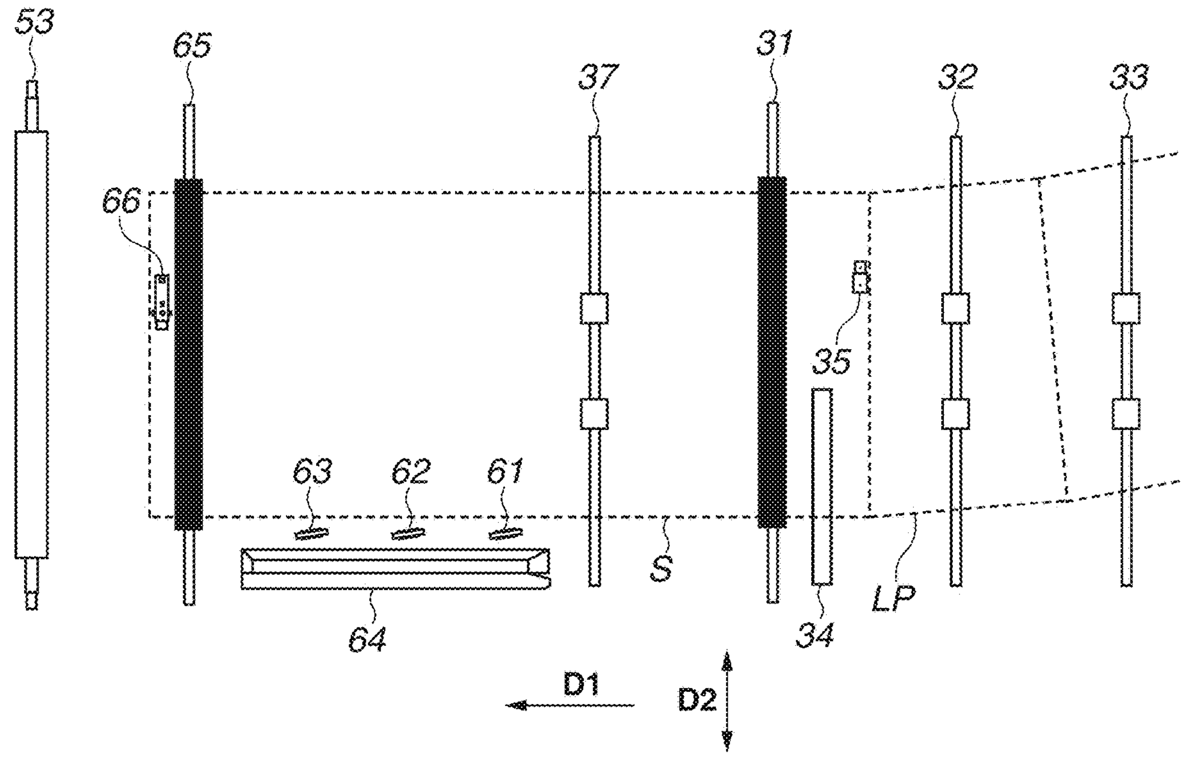
FIG. 12A is a plan view illustrating the registration unit according to the exemplary embodiment in a state where the leading edge of a long sheet reaches the registration roller pair.
Figure 12B:
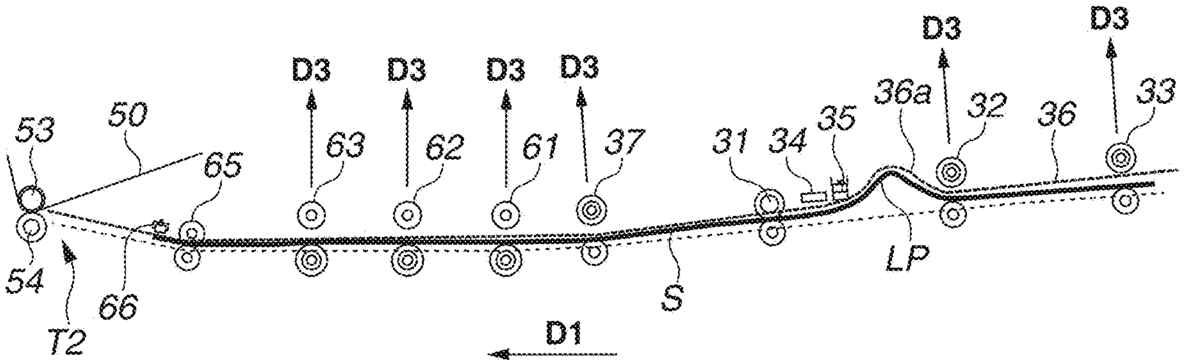
FIG. 12B is a cross-sectional view illustrating the registration unit according to the exemplary embodiment in a state where the leading edge of a long sheet reaches the registration roller pair.

After correcting the skew of the sheet S, the CIS 34 detects the lateral position of the sheet S. Thereafter, the sheet having undergone skew correction by the pre-registration roller pair 31 is conveyed to the registration roller pair 65 without being nipped by the oblique-feed roller pairs 61, 62, and 63. As illustrated in FIGS. 12A and 12B, after the leading edge of the sheet S reaches the registration roller pair 65, the control unit 200 executes the second mode for shifting the sheet S in the lateral direction via the registration roller pair 65 and the pre-registration roller pair 31 at the same time to correct the lateral registration. In this case, the oblique-feed roller pairs 61, 62, and 63 and the conveyance roller pairs 37, 32, and 33 separate their nip portions. If the sheet S is laterally shifted by the registration roller pair 65 and the pre-registration roller pair 31 at the same time, the sheet S can be nipped with a strong force. This enables preventing the sheet S from being re-skewed or creased by the stress applied to the sheet S in the lateral registration correction.

The loop LP formed in the skew correction is maintained upstream of the pre-registration roller pair 31, making it possible to reduce the twisting stress in laterally shifting the sheet S. As illustrated in FIG. 12B, when laterally shifting the sheet S, the control unit 200 separates the conveyance roller pair 32 to extend the loop LP from between the pre-registration roller pair 31 and the conveyance roller pair 32 to between the pre-registration roller pair 31 and the conveyance roller pair 33. This enables further reducing the twisting stress in laterally shifting the sheet S, further preventing the sheet S from being skewed or creased.

Figure 13A:
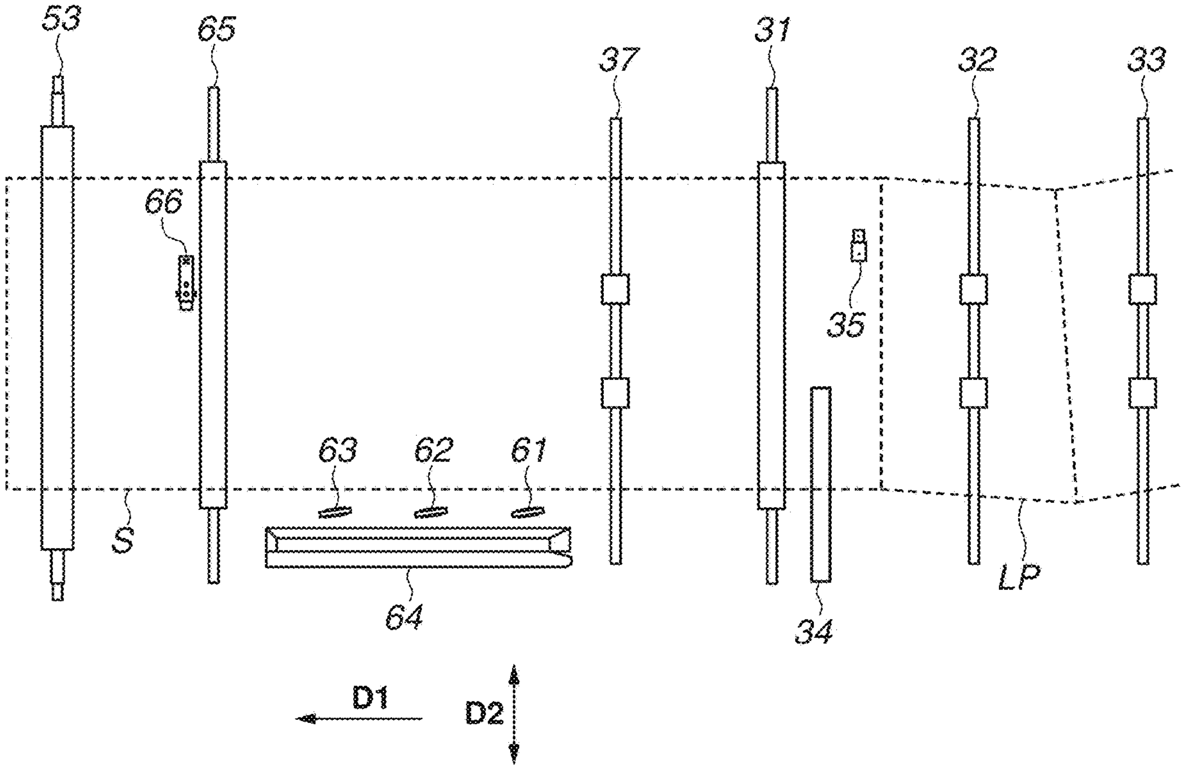
FIG. 13A is a plan view illustrating the registration unit according to the exemplary embodiment in a state where the leading edge of a long sheet reaches the secondary transfer nip.
Figure 13B:
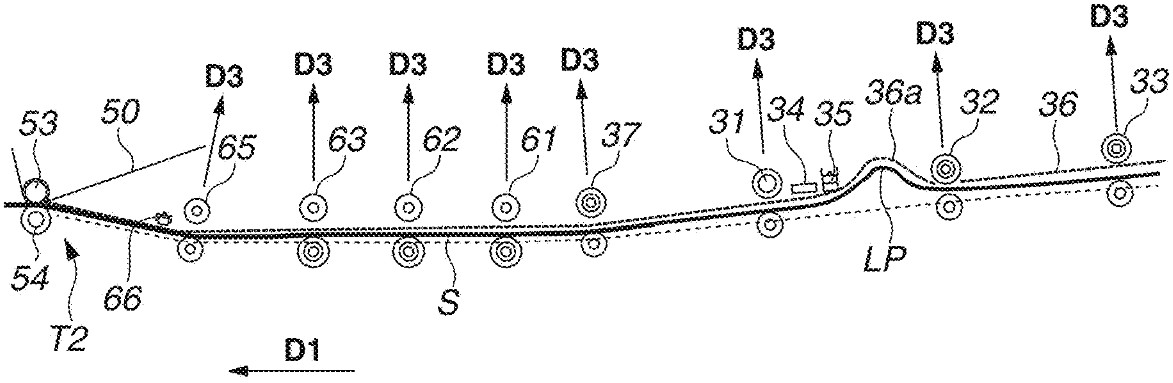
FIG. 13B is a cross-sectional view illustrating the registration unit according to the exemplary embodiment in a state where the leading edge of a long sheet reaches the secondary transfer nip.

As illustrated in FIGS. 13A and 13B, when the sheet S is conveyed to the secondary transfer nip T2, all of the upstream roller pairs are separated in the direction D3. Thus, the secondary transfer nip T2 no longer receives forces from the roller pairs via the sheet S, making it possible to convey the sheet S while accurately transferring an image to the sheet S.

The present exemplary embodiment has been described above centering on a case where the second skew correction unit 60 is a skew correction means by the oblique-feed registration, the present exemplary embodiment is not limited thereto. For example, the second skew correction unit 60 may adopt, for example, a registration method by a speed difference or a registration method by a swing shift as well as a skew correction method by oblique-feed registration. This means that the second skew correction unit 60 is applicable to an active registration method for correcting a skew of a sheet (active sheet) while conveying the sheet.

According to the present exemplary embodiment, in the case of conveying a long sheet, the control unit 200 starts the rotation of the pre-registration roller pair 31 at the timing corresponding to the image formation by the image forming unit 40 in the first skew correction operation by the first skew correction unit 30. The relevant timing is, for example, the timing when the toner image reaches the secondary transfer nip T2.

When performing the registration correction by bringing the sheet S into contact with the pre-registration roller pair 31, the sheet S is preferably once stopped and hence the distance between sheets S increases, possibly degrading the productivity, in continuous sheet feeding. To solve this problem, it is demanded that the sheet S that has been subjected to the registration correction is more accelerated than the transfer conveyance speed to decrease the distance between sheets.

More specifically, for example, in the case of conveying a non-long sheet, the control unit 200 conveys the sheet S at a first speed via the second skew correction unit 60. In this case, when conveying a long sheet, the control unit 200 passes the sheet at a second speed faster than the first speed via the second skew correction unit 60. Even when conveying a long sheet, this enables decreasing the distance between sheets to reduce the risk of productivity degradation in comparison with a case of conveyance at the first speed. As an example of the second speed, the conveyance speed at the secondary transfer nip T2 can be increased by several tens of percent.

[Registration Correction Processing]

Figure 14:
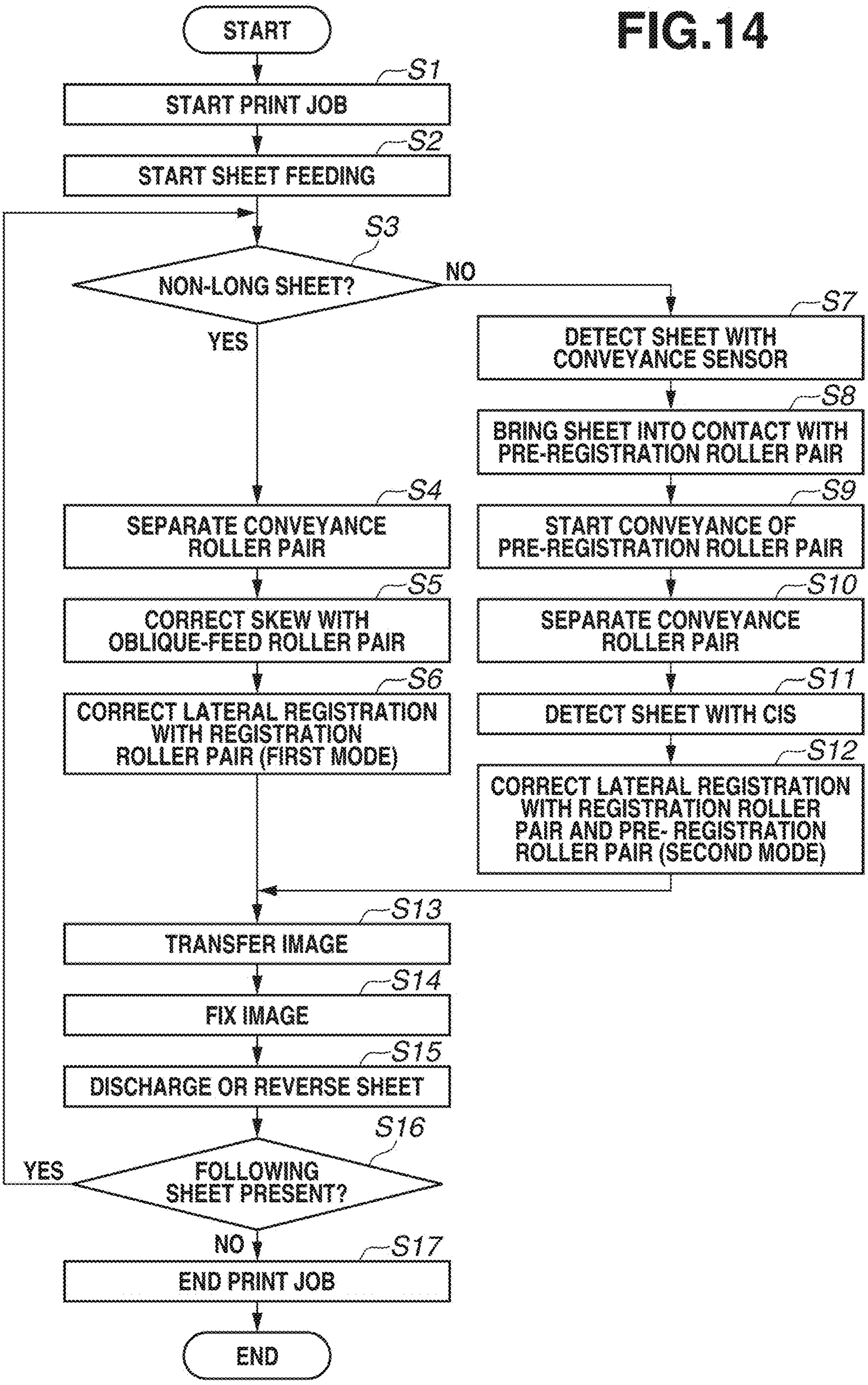
FIG. 14 is a flowchart illustrating processing for sheet conveyance performed by the registration unit according to the exemplary embodiment.

Registration correction processing according to the exemplary embodiment of the present disclosure will now be described with reference to the flowchart illustrated in FIG. 14. When the control unit 200 receives a print execution instruction from a user via, for example, the computer 300, the control unit 200 starts, in step S1, a print job. The user can also specify the number of copies to be printed and the sheet type to be used for printing.

In step S2, the control unit 200 starts feeding the sheet S. In step S3, the control unit 200 determines whether the sheet type specified in the print job is a non-long sheet. If the control unit 200 determines that the type of the sheet S is a non-long sheet (YES in step S3), the processing proceeds to step S4. In step S4, the control unit 200 conveys the sheet S via the upstream conveyance roller pairs 37, 32, and 33 and the pre-registration roller pair 31. When the leading edge of the sheet reaches the oblique-feed roller pairs 61, 62, and 63, the control unit 200 releases the nip portions of the upstream conveyance roller pairs 37, 32, and 33 and the pre-registration roller pair 31 to set them in the separation state. In step S5, the control unit 200 obliquely feeds the sheet S via the oblique-feed roller pairs 61, 62, and 63 to correct the skew of the sheet S. In step S6 (first mode), the control unit 200 moves the sheet S while adjusting the final lateral registration position of the sheet S to the image position via the registration roller pair 65.

If the control unit 200 determines that the type of sheet S is not a non-long sheet but a long sheet (NO in step S3), the processing proceeds to step S7. In step S7, the control unit 200 detects the leading edge of the sheet S with the conveyance sensor 35. In step S8, the control unit 200 brings the leading edge of the sheet S into contact with the pre-registration roller pair 31 based on the detection timing of the conveyance sensor 35 to correct the skew of the sheet S. In step S9, the control unit 200 starts the conveyance of the sheet S once stopped to the downstream side in synchronization with the timing when the toner image reaches the secondary transfer nip T2. In step S10, the control unit 200 separates the oblique-feed roller pairs 61, 62, and 63 and the conveyance roller pairs 37, 32, and 33 to set these roller pairs in the separation state. In step S11, the control unit 200 detects the lateral position of the sheet S via the CIS 34. In the second mode, the control unit 200 sets the amount of movement of the registration roller pair 65 and the pre-registration roller pair 31 in the lateral direction D2 based on the result of the detection by the CIS 34. In step S12 (second mode), the control unit 200 corrects the lateral registration while nipping the sheet S via the registration roller pair 65 and the pre-registration roller pair 31 based on the result of the lateral registration detection for the detected sheet S.

In step S13, regardless of whether the sheet S is a non-long sheet or a long sheet, the control unit 200 transfers the image at the secondary transfer nip T2. In step S14, the control unit 200 fixes the toner image to the sheet S. In step S15, the control unit 200 discharges or reverses the sheet S according to the print job. In step S16, the control unit 200 determines whether the following sheet is present. If the control unit 200 determines that the following sheet is present (YES in step S16), the processing returns to step S3. In step S3, the control unit 200 determines again whether the sheet type specified in the print job is a long sheet. If the control unit 200 determines that the following sheet is not present (NO in step S16), the processing proceeds to step S17. In step S17, the control unit 200 ends the print job.

As described above, when conveying a long sheet, the printer 1 according to the present exemplary embodiment can perform the second mode for moving the sheet S in the lateral direction D2 while nipping the sheet S via the registration roller pair 65 and the pre-registration roller pair 31, thus correcting the sheet conveyance position in the lateral direction D2. This enables preventing the sheet S from being twisted to a further extent than in a case where a long sheet is moved in the lateral direction D2 only via the registration roller pair 65. This also enables preventing the sheet S from being creased, folded, or skewed, thus avoiding the occurrence of a defective image. In other words, in the lateral registration correction for a long sheet, the control unit 200 shifts the sheet S in the lateral direction via two different roller pairs at the same time to nip the sheet S with a strong force, thus preventing the sheet S from being skewed or creased.

According to the present exemplary embodiment, the length of a long sheet is such that the upstream edge is positioned at the curved portion 39*a* when the downstream edge of the sheet in the conveyance direction D1 is nipped by the registration roller pair 65. In the lateral registration correction in a long sheet case, the upstream side of the sheet S is positioned at the curved portion 39*a*, providing a large resistance to the movement in the lateral direction D2 relative to the conveyance guide 36. Thus, the sheet S may possibly be twisted when moved only via the registration roller pair 65. According to the present exemplary embodiment in contrast, when conveying a long sheet, the control unit 200 moves the sheet S in the lateral direction D2 while nipping the sheet S via the registration roller pair 65 and the pre-registration roller pair 31 to correct the sheet conveyance position in the lateral direction D2, thus preventing the sheet S from being twisted.

According to the present exemplary embodiment, in the lateral registration correction for a non-long sheet during execution of the first mode, the control unit 200 sets the registration roller pair 65 in the contact state and sets the pre-registration roller pair 31, the conveyance roller pairs 37, 32, and 33, and the oblique-feed roller pairs 61, 62, and 63 in the separation state. On the other hand, in the lateral registration correction for a long sheet during execution of the second mode, the control unit 200 sets the registration roller pair 65 and the pre-registration roller pair 31 in the contact state and sets the conveyance roller pairs 37, 32, and 33 and the oblique-feed roller pairs 61, 62, and 63 in the separation state. Thus, when performing the lateral registration correction, the control unit 200 sets the registration roller pair 65 in the contact state to use it for sheet conveyance and lateral movement regardless of the sheet length.

According to the present exemplary embodiment, when moving the sheet S in the lateral direction D2 to correct the conveyance position in the lateral direction D2 in the first and the second modes, the control unit 200 sets the conveyance roller pair 33 in the separation state. The sheet S is therefore no longer nipped in a wide range from the registration roller pair 65 and the pre-registration roller pair 31 to the upstream side in the sheet conveyance direction D1, making it easier to perform the lateral registration correction.

According the above-described present exemplary embodiment, the control unit 200 executes the first mode when conveying a non-long sheet and executes the second mode when conveying a long sheet. However, the present exemplary embodiment is not limited thereto. For example, the control unit 200 may execute the first mode when conveying a long sheet or execute the second mode when conveying a non-long sheet.

According to the above-described exemplary embodiment, when conveying a non-long sheet, the control unit 200 does not perform the skew correction via the first skew correction unit 30. However, the present disclosure is not limited thereto. Even when conveying a non-long sheet, the control unit 200 may perform the skew correction via the first skew correction unit 30. For example, the first skew correction unit 30 can perform the high-accuracy skew correction even when conveying a special sheet (e.g., thin paper and thick paper) which may possibly degrade the skew correction accuracy. In other words, the configuration according to the present exemplary embodiment is considered as one example in which a non-long sheet is subjected to the skew correction by the second skew correction unit 60 and a long sheet is subjected to the skew correction by the first skew correction unit 30.

In the above-described exemplary embodiment, two different pairs (e.g., the registration roller pair 65 and the pre-registration roller pair 31) are used when correcting the movement of a long sheet in the lateral direction D2. However, the present disclosure is not limited thereto, and three or more roller pairs are also applicable. More specifically, the number of roller pairs for nipping the sheet S in the lateral registration correction for a long sheet is preferably larger than the number of roller pairs for nipping the sheet S in the lateral registration correction for a non-long sheet.

The above-described positions of the CIS 34, the conveyance sensor 35, and the leading edge detection sensor 66 are not limited to the positions according to the present exemplary embodiment. More specifically, these sensors are preferably disposed at positions upstream of the secondary transfer nip T2, where the sheet position correction is completed before the sheet S reaches the secondary transfer nip T2.

While the present disclosure has been described with reference to exemplary embodiments, it is to be understood that the disclosure is not limited to the disclosed exemplary embodiments. The scope of the following claims is to be accorded the broadest interpretation so as to encompass all such modifications and equivalent structures and functions.

This application claims the benefit of priority from Japanese Patent Application No. 2023-195816, filed Nov. 17, 2023, which is hereby incorporated by reference herein in its entirety.

What is claimed is:

1. A sheet conveyance apparatus comprising:

a sheet supporting portion configured to stack sheets;

a feed roller configured to feed a sheet stacked on the sheet supporting portion;

a first conveyance roller pair configured to nip and convey the sheet fed by the feed roller, and, while nipping the sheet, move the sheet in a lateral direction perpendicular to a sheet conveyance direction to correct a sheet position in the lateral direction;

a second conveyance roller pair disposed upstream of the first conveyance roller pair and downstream of the feed roller in the sheet conveyance direction, and configured to nip and convey the sheet, and, while nipping the sheet, move the sheet in the lateral direction to correct the sheet position in the lateral direction; and a control unit configured to control the first conveyance roller pair and the second conveyance roller pair, wherein the control unit is configured to execute:

a first mode for conveying a first sheet having a first length in the sheet conveyance direction, the first mode being configured to move the first sheet in the lateral direction, while nipping the first sheet via the first conveyance roller pair and not nipping the first sheet via the second conveyance roller pair, to correct a conveyance position in the lateral direction; and a second mode for conveying a second sheet having a second length longer than the first length in the sheet conveyance direction and a distance between the first conveyance roller pair and the second conveyance roller pair in the sheet conveyance direction, the second mode being configured to move the second sheet in the lateral direction, while nipping the second sheet via the first conveyance roller pair and the second conveyance roller pair, to correct the conveyance position in the lateral direction.

2. The sheet conveyance apparatus according to claim 1, further comprising a sheet conveyance path configured to convey the sheet upstream of the second conveyance roller pair in the sheet conveyance direction and include a curved portion having a curved shape when viewed from the lateral direction, wherein the second length is a length such that, when a downstream edge in the sheet conveyance direction is nipped by the first conveyance roller pair, an upstream edge is positioned at the curved portion, and wherein the first length is a length such that, when the downstream edge in the sheet conveyance direction is nipped by the first conveyance roller pair, the upstream edge is positioned downstream of the curved portion.

3. The sheet conveyance apparatus according to claim 1, further comprising a third conveyance roller pair disposed upstream of the second conveyance roller pair in the sheet conveyance direction, and configured to nip and convey the sheet, wherein, in the second mode, the control unit brings a leading edge of the second sheet conveyed by the third conveyance roller pair into contact with a nip portion of the second conveyance roller pair to form a deflection on the second sheet to correct a skew of the leading edge of the second sheet, and wherein, after correcting the skew, the control unit nips and conveys the second sheet via the second conveyance roller pair, while nipping the second sheet via the first conveyance roller pair and the second conveyance roller pair, to correct the conveyance position in the lateral direction.

4. The sheet conveyance apparatus according to claim 1, comprising:

an abutting surface extending along the sheet conveyance direction, configured to come into contact with an edge of the first sheet to be conveyed in the lateral direction; and an oblique-feed roller pair disposed between the first conveyance roller pair and the second conveyance roller pair in the sheet conveyance direction, and configured to obliquely feed the first sheet in a direction inclined relative to the sheet conveyance direction so that the sheet approaches the abutting surface in the lateral direction as the sheet advances downstream in the sheet conveyance direction, and move a side edge of the first sheet along the abutting surface to correct a skew of the first sheet, wherein, after correcting the skew of the first sheet via the oblique-feed roller pair and conveying the sheet in the first mode, the control unit moves the first sheet in the lateral direction, while nipping the first sheet via the first conveyance roller pair and not nipping the first sheet via the second conveyance roller pair, to correct the conveyance position in the lateral direction.

5. The sheet conveyance apparatus according to claim 4, wherein each of the first conveyance roller pair, the second conveyance roller pair, the third conveyance roller pair, and the oblique-feed roller pair forms a nip portion that can switch between a contact state where the sheet is nipped and conveyed and a separation state where the nip portion is released to cancel nipping of the sheet, wherein, when moving the first sheet in the lateral direction to correct the conveyance position in the lateral direction during execution of the first mode, the control unit sets the first conveyance roller pair in the contact state and sets the oblique-feed roller pair, the second conveyance roller pair, and the third conveyance roller pair in the separation state, and wherein, when moving the second sheet in the lateral direction to correct the conveyance position in the lateral direction during execution of the second mode, the control unit sets the first conveyance roller pair and the second conveyance roller pair in the contact state and sets the third conveyance roller pair and the oblique-feed roller pair in the separation state.

6. The sheet conveyance apparatus according to claim 5, further comprising a fourth conveyance roller pair disposed upstream of the third conveyance roller pair in the sheet conveyance direction, and configured to nip the sheet, wherein the fourth conveyance roller pair can switch between a contact state where a nip portion is formed by the roller pair to nip the sheet and the separation state where the nip portion is released to cancel nipping of the sheet, and wherein, when moving the sheet in the lateral direction to correct the conveyance position in the lateral direction in the first mode and the second mode, the control unit sets the fourth conveyance roller pair in the separation state.

7. The sheet conveyance apparatus according to claim 1, further comprising a detection unit configured to detect the conveyance position of the sheet to be conveyed in the lateral direction, wherein, in the second mode, the control unit sets moving amounts of the first conveyance roller pair and the second conveyance roller pair in the lateral direction based on a detection result by the detection unit.

8. The sheet conveyance apparatus according to claim 3, further comprising a guide member configured to guide the sheet upstream of the second conveyance roller pair in the sheet conveyance direction, wherein the guide member comprises a space forming portion configured to form a deflection of the sheet when the leading edge of the sheet to be conveyed by the third conveyance roller pair comes into contact with the second conveyance roller pair.

9. The sheet conveyance apparatus according to claim 1, wherein the first conveyance roller pair is disposed upstream of an image forming unit configured to form an image on the sheet in the sheet conveyance direction, and wherein the control unit conveys the sheet via the first conveyance roller pair according to a timing when the image is formed on the sheet by the image forming unit.

10. An image forming apparatus comprising:

the sheet conveyance apparatus according to claim 1; and an image forming unit configured to form an image on the sheet conveyed by the sheet conveyance apparatus.

11. The image forming apparatus according to claim 10, wherein the image forming unit includes an image carrier configured to carry a toner image, and a transfer unit configured to transfer the toner image carried by the image carrier to the sheet, and wherein the sheet conveyance apparatus conveys the sheet to the transfer unit.

12. The sheet conveyance apparatus according to claim 1, further comprising a moving unit configured to move the first conveyance roller pair and the second conveyance roller pair in the lateral direction.

13. The sheet conveyance apparatus according to claim 12, wherein the moving unit includes a first motor configured to move the first conveyance roller pair in the lateral direction, and a second motor configured to move the second conveyance roller pair in the lateral direction.

* * * * *